US012361887B2

(12) United States Patent
Xuan et al.

(10) Patent No.: US 12,361,887 B2
(45) **Date of Patent: *Jul. 15, 2025**

(54) PIXEL DRIVING CIRCUIT, PIXEL DRIVING METHOD, DISPLAY PANEL AND DISPLAY DEVICE

(71) Applicant: BOE Technology Group Co., Ltd., Beijing (CN)

(72) Inventors: Minghua Xuan, Beijing (CN); Xiaochuan Chen, Beijing (CN); Dongni Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,041

(22) Filed: Dec. 20, 2023

(65) Prior Publication Data

US 2024/0127756 A1 Apr. 18, 2024

Related U.S. Application Data

(63) Continuation of application No. 17/052,152, filed as application No. PCT/CN2019/104235 on Sep. 3, 2019, now Pat. No. 11,893,939.

(51) Int. Cl.
*G09G 3/3258* (2016.01)
*G09G 3/20* (2006.01)
(Continued)

(52) U.S. Cl.
CPC ......... *G09G 3/3258* (2013.01); *G09G 3/2007* (2013.01); *G09G 3/3233* (2013.01);
(Continued)

(58) Field of Classification Search
CPC .. G09G 3/3258; G09G 3/2007; G09G 3/3233; G09G 3/3266; G09G 3/3275;
(Continued)

(56) References Cited

U.S. PATENT DOCUMENTS 10,692,432 B2 * 6/2020 Zhang .................. G09G 3/3225
10,909,924 B2 * 2/2021 Yang .................... G09G 3/3258
(Continued)

FOREIGN PATENT DOCUMENTS

CN 103700342 A 4/2014
CN 104821150 A 8/2015
(Continued)

OTHER PUBLICATIONS

CN201980001597.2, Decision of Rejection, Dec. 20, 2022.
(Continued)

*Primary Examiner* — Jeff Piziali
(74) *Attorney, Agent, or Firm* — The Webb Law Firm

(57) ABSTRACT

A pixel driving circuit includes a driving signal control sub-circuit and a driving duration control sub-circuit. The driving signal control sub-circuit is configured to provide a driving signal to the driving duration control sub-circuit under control of both a first scanning signal terminal and a enable signal terminal. The driving signal is related to a first data signal received at a first data signal terminal and a first voltage signal received at a first voltage signal terminal. The driving duration control sub-circuit is configured to, under control of the second scanning signal terminal and the enable signal terminal, transmit the driving signal to the element to be driven based on a second data signal with a gradually varying working potential received at the second data signal terminal. The first data signal is different from the second data signal.

17 Claims, 7 Drawing Sheets

(51) Int. Cl.
*G09G 3/3233* (2016.01)
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2300/0426* (2013.01); *G09G 2300/0819* (2013.01); *G09G 2300/0842* (2013.01); *G09G 2310/08* (2013.01); *G09G 2330/021* (2013.01)

(58) Field of Classification Search
CPC ... G09G 2300/0426; G09G 2300/0819; G09G 2300/0842; G09G 2310/08; G09G 2330/021; G09G 2310/0262; G09G 3/32; G09G 2300/0852; G09G 2300/0861; G09G 2310/0259; G09G 2310/066; G09G 2320/0209; G09G 2320/0219
See application file for complete search history.

(56) References Cited

U.S. PATENT DOCUMENTS

| | | | | |
|---|---|---|---|---|
| 11,893,939 | B2 * | 2/2024 | Xuan | G09G 3/3258 |
| 2009/0027376 | A1 * | 1/2009 | Kwon | G09G 3/3233 345/83 |
| 2009/0051674 | A1 * | 2/2009 | Kimura | G09G 3/3233 345/204 |
| 2009/0121981 | A1 | 5/2009 | Yoo et al. | |
| 2016/0035276 | A1 | 2/2016 | Yin et al. | |
| 2016/0210892 | A1 * | 7/2016 | Ohara | G09G 3/2022 |
| 2017/0039934 | A1 * | 2/2017 | Ma | G09G 3/3233 |
| 2018/0130412 | A1 | 5/2018 | Zhang et al. | |
| 2018/0247587 | A1 * | 8/2018 | Kimura | G09G 3/3233 |
| 2018/0261155 | A1 | 9/2018 | Ota | |
| 2018/0301080 | A1 | 10/2018 | Shigeta et al. | |
| 2018/0336822 | A1 * | 11/2018 | Yan | G09G 3/3233 |
| 2019/0236997 | A1 | 8/2019 | Han | |
| 2019/0304367 | A1 * | 10/2019 | Li | G09G 3/3291 |
| 2019/0362667 | A1 * | 11/2019 | Ma | G06V 40/1318 |
| 2020/0098305 | A1 * | 3/2020 | Yang | H03K 25/02 |
| 2020/0388214 | A1 * | 12/2020 | Yang | G09G 3/3266 |
| 2021/0174736 | A1 | 6/2021 | Yang et al. | |
| 2021/0174747 | A1 | 6/2021 | Chen et al. | |
| 2021/0183308 | A1 | 6/2021 | Xuan | |
| 2021/0201760 | A1 | 7/2021 | Wang et al. | |
| 2021/0366364 | A1 | 11/2021 | Xuan et al. | |
| 2021/0383752 | A1 * | 12/2021 | Yang | G09G 3/3233 |
| 2021/0407376 | A1 | 12/2021 | Yue et al. | |
| 2022/0005403 | A1 | 1/2022 | Yue et al. | |
| 2022/0383800 | A1 | 12/2022 | Cong et al. | |

FOREIGN PATENT DOCUMENTS

| | | | | |
|---|---|---|---|---|
| CN | 107068059 | A | 8/2017 | |
| CN | 107068066 | A | 8/2017 | |
| CN | 107358918 | A | 11/2017 | |
| CN | 107909966 | A | 4/2018 | |
| CN | 108389550 | A | 8/2018 | |
| CN | 108538241 | A | 9/2018 | |
| CN | 109308872 | A | 2/2019 | |
| CN | 109872680 | A | 6/2019 | |
| CN | 109920371 | A | 6/2019 | |
| CN | 109979378 | A | 7/2019 | |
| CN | 110010057 | A | 7/2019 | |
| CN | 110021263 | A | 7/2019 | |
| CN | 110021264 | A | 7/2019 | |
| CN | 110085164 | A | 8/2019 | |
| EP | 3816978 | A1 | 5/2021 | |
| JP | 2004151587 | A | 5/2004 | |
| WO | WO-2018133246 | A1 * | 7/2018 | G09G 3/3233 |
| WO | 2018233599 | A1 | 12/2018 | |
| WO | 2019109615 | A1 | 6/2019 | |
| WO | 2020007024 | A1 | 1/2020 | |

OTHER PUBLICATIONS

CN201980001597.2, First Office Action, Apr. 12, 2022.
CN201980002266.0, First Office Action, Apr. 24, 2022.
EP 19944219.5, Extended European Search Report, Jun. 10, 2022.
EP 19944219.5, Communication, Mar. 10, 2023.
PCT/CN2019/104235, International Search Report, May 28, 2020.
PCT/CN2019/115163, International Search Report, May 28, 2020.
U.S. Appl. No. 17/052,147, Ex Parte Quayle Office Action, Aug. 3, 2021.
U.S. Appl. No. 17/052,147, Notice of Allowance and Fee(s) Due, Oct. 20, 2021.
U.S. Appl. No. 17/052,147, Supplemental Notice of Allowability, Nov. 4, 2021.
U.S. Appl. No. 17/052,152, Office Action, May 25, 2023.
U.S. Appl. No. 17/052,152, Notice of Allowance and Fee(s) Due, Sep. 27, 2023.
U.S. Appl. No. 17/052,152, Office Action, Jan. 25, 2023.

* cited by examiner

PIXEL DRIVING CIRCUIT, PIXEL DRIVING METHOD, DISPLAY PANEL AND DISPLAY DEVICE

CROSS-REFERENCE TO RELATED APPLICATIONS

This application is a continuation of U.S. application Ser. No. 17/052,152, filed on Oct. 30, 2020, which claims priority to International Patent Application No. PCT/CN2019/104235 filed on Sep. 3, 2019, which are incorporated herein by reference in their entirety.

TECHNICAL FIELD

The present disclosure relates to the field of display technologies, and in particular, to a pixel driving circuit, a pixel driving method, a display panel and a display device.

BACKGROUND

In the field of display technologies, an application of a high-dynamic range (HDR) technology in a display device can improve an image quality of a displayed image, and has higher requirements on a color gamut and a brightness of the display device. A micro light-emitting diode display device is more suitable for implementing a high-dynamic range display due to its characteristics of high brightness and wide color gamut.

SUMMARY

In a first aspect, a pixel driving circuit is provided. The pixel driving circuit includes a driving signal control sub-circuit and a driving duration control sub-circuit. The driving signal control sub-circuit is electrically connected to a first scanning signal terminal, a first data signal terminal, a first voltage signal terminal, an enable signal terminal, and the driving duration control sub-circuit. The driving signal control sub-circuit is configured to provide a driving signal to the driving duration control sub-circuit under control of the first scanning signal terminal and the enable signal terminal. The driving signal is related to a first data signal received at the first data signal terminal and a first voltage signal received at the first voltage signal terminal. The driving duration control sub-circuit is further electrically connected to a second scanning signal terminal, a second data signal terminal, the enable signal terminal and an element to be driven, and is configured to under control of the second scanning signal terminal and the enable signal terminal, transmit the driving signal to the element to be driven based on a second data signal with a gradually varying working potential received at the second data signal terminal, so as to control a duration for which the driving signal is transmitted to the element to be driven. The first data signal is different from the second data signal.

In some embodiments, the driving signal control sub-circuit includes a first data writing unit, a first driving unit, and a first control unit. The first data writing unit is electrically connected to the first scanning signal terminal, the first data signal terminal and the first driving unit, and is configured to write the first data signal received at the first data signal terminal into the first driving unit under control of the first scanning signal terminal.

The first driving unit is further electrically connected to the first voltage signal terminal and the first control unit, and is configured to generate the driving signal according to the written first data signal and the first voltage signal received at the first voltage signal terminal, and transmit the driving signal to the first control unit.

The first control unit is further electrically connected to the enable signal terminal, the first voltage signal terminal and the driving duration control sub-circuit, and is configured to transmit the driving signal to the driving duration control sub-circuit according to the first voltage signal under control of the enable signal terminal.

In some embodiments, the first data writing unit includes a first transistor and a second transistor. A control electrode of the first transistor is electrically connected to the first scanning signal terminal, a first electrode of the first transistor is electrically connected to the first data signal terminal, and a second electrode of the first transistor is electrically connected to the first driving unit. A control electrode of the second transistor is electrically connected to the first scanning signal terminal, and a first electrode and a second electrode of the second transistor are electrically connected to the first driving unit.

The first driving unit includes a first storage capacitor and a third transistor. A first terminal of the first storage capacitor is electrically connected to the first data writing unit and the first control unit, and a second terminal of the first storage capacitor is electrically connected to the first data writing unit. A control electrode of the third transistor is electrically connected to the second terminal of the first storage capacitor and the first data writing unit, a first electrode of the third transistor is electrically connected to the first voltage signal terminal, and a second electrode of the third transistor is electrically connected to the first data writing unit and the first control unit.

The first control unit includes a fourth transistor and a fifth transistor. A control electrode of the fourth transistor is electrically connected to the enable signal terminal, a first electrode of the fourth transistor is electrically connected to the first voltage signal terminal, and a second electrode of the fourth transistor is electrically connected to the first driving unit. A control electrode of the fifth transistor is electrically connected to the enable signal terminal, a first electrode of the fifth transistor is electrically connected to the first driving unit, and a second electrode of the fifth transistor is electrically connected to the driving duration control sub-circuit.

In some embodiments, the driving signal control sub-circuit further includes a first reset unit. The first reset unit is electrically connected to the first voltage signal terminal, a reset signal terminal, a initialization signal terminal and the first driving unit, and is configured to reset a voltage of the first driving unit according to the first voltage signal received at the first voltage signal terminal and an initialization signal received at the initialization signal terminal under control of the reset signal terminal.

In some embodiments, the first reset unit includes a sixth transistor and a seventh transistor. A control electrode of the sixth transistor is electrically connected to the reset signal terminal, a first electrode of the sixth transistor is electrically connected to the first voltage signal terminal, and a second electrode of the sixth transistor is electrically connected to the first driving unit. A control electrode of the seventh transistor is electrically connected to the reset signal terminal, a first electrode of the seventh transistor is electrically connected to the initialization signal terminal, and a second electrode of the seventh transistor is electrically connected to the first driving unit.

In some embodiments, the driving signal control sub-circuit includes a first transistor, a second transistor, a third transistor, a fourth transistor, a fifth transistor, a sixth transistor, a seventh transistor, and a first storage capacitor. A control electrode of the first transistor is electrically connected to the first scanning signal terminal, a first electrode of the first transistor is electrically connected to the first data signal terminal, and a second electrode of the first transistor is electrically connected to a first terminal of the first storage capacitor. A control electrode of the second transistor is electrically connected to the first scanning signal terminal, a first electrode of the second transistor is electrically connected to a second electrode of the third transistor, and a second electrode of the second transistor is electrically connected to a second terminal of the first storage capacitor and a control electrode of the third transistor.

The control electrode of the third transistor is further electrically connected to the second terminal of the first storage capacitor, a first electrode of the third transistor is electrically connected to the first voltage signal terminal, and the second electrode of the third transistor is further electrically connected to a first electrode of the fifth transistor. A control electrode of the fourth transistor is electrically connected to the enable signal terminal, a first electrode of the fourth transistor is electrically connected to the first voltage signal terminal, and a second electrode of the fourth transistor is electrically connected to the first terminal of the first storage capacitor.

A control electrode of the fifth transistor is electrically connected to the enable signal terminal, and a second electrode of the fifth transistor is electrically connected to the driving duration control sub-circuit. A control electrode of the sixth transistor is electrically connected to a reset signal terminal, a first electrode of the sixth transistor is electrically connected to the first voltage signal terminal, and a second electrode of the sixth transistor is electrically connected to the first terminal of the first storage capacitor. A control electrode of the seventh transistor is electrically connected to the reset signal terminal, a first electrode of the seventh transistor is electrically connected to an initialization signal terminal, and a second electrode of the seventh transistor is electrically connected to the second terminal of the first storage capacitor and the control electrode of the third transistor.

In some embodiments, the first transistor, the second transistor, the third transistor, the fourth transistor, the fifth transistor, the sixth transistor, and the seventh transistor are all P-type transistors or N-type transistors.

In some embodiments, the driving duration control sub-circuit includes a second data writing unit, a second control unit, and a second driving unit. The second data writing unit is electrically connected to the second scanning signal terminal, the second data signal terminal and the second driving unit, and is configured to write a second data signal with a set working potential received at the second data signal terminal into the second driving unit under control of the second scanning signal terminal.

The second control unit is electrically connected to the enable signal terminal, the second data signal terminal and the second driving unit, and is configured to transmit a second data signal with a potential varying within a set range received at the second data signal terminal to the second driving unit under control of the enable signal terminal.

The second driving unit is further electrically connected to the driving signal control sub-circuit, and is configured to transmit the driving signal to the second control unit and control a duration for which the driving signal is transmitted to the second control unit, according to the second data signal with the set working potential and the second data signal with the potential varying within the set range. The second control unit is further electrically connected to the element to be driven, and is further configured to transmit the driving signal to the element to be driven.

In some embodiments, the second data writing unit includes an eighth transistor. A control electrode of the eighth transistor is electrically connected to the second scanning signal terminal, a first electrode of the eighth transistor is electrically connected to the second data signal terminal, and a second electrode of the eighth transistor is electrically connected to the second driving unit.

The second control unit includes a ninth transistor and a tenth transistor. A control electrode of the ninth transistor is electrically connected to the enable signal terminal, a first electrode of the ninth transistor is electrically connected to the second data signal terminal, and a second electrode of the ninth transistor is electrically connected to the second driving unit. A control electrode of the tenth transistor is electrically connected to the enable signal terminal, a first electrode of the tenth transistor is electrically connected to the second driving unit, and a second electrode of the tenth transistor is electrically connected to the light-emitting sub-circuit.

The second driving unit includes a second storage capacitor and an eleventh transistor. A first terminal of the second storage capacitor is electrically connected to the second data writing unit and the second control unit. A control electrode of the eleventh transistor is electrically connected to a second terminal of the second storage capacitor, a first electrode of the eleventh transistor is electrically connected to the driving signal control sub-circuit, and a second electrode of the eleventh transistor is electrically connected to the second control unit.

In some embodiments, the driving duration control sub-circuit further includes a second reset unit. The second reset unit is electrically connected to a reset signal terminal, an initialization signal terminal and the second driving unit, and is configured to reset a voltage of the second driving unit according to an initialization signal received at the initialization signal terminal under control of the reset signal terminal.

In some embodiments, the second reset unit includes a twelfth transistor and a thirteenth transistor. A control electrode of the twelfth transistor is electrically connected to the reset signal terminal, a first electrode of the twelfth transistor is electrically connected to the initialization signal terminal, and a second electrode of the twelfth transistor is electrically connected to the second driving unit. A control electrode of the thirteenth transistor is electrically connected to the reset signal terminal, and a first electrode and a second electrode of the thirteenth transistor are electrically connected to the second driving unit.

In some embodiments, the driving duration control sub-circuit includes an eighth transistor, a ninth transistor, a tenth transistor, an eleventh transistor, a twelfth transistor, a thirteenth transistor and a second storage capacitor. A control electrode of the eighth transistor is electrically connected to the second scanning signal terminal, a first electrode of the eighth transistor is electrically connected to the second data signal terminal, and a second electrode of the eighth transistor is electrically connected to a first terminal of the second storage capacitor. A control electrode of the ninth transistor is electrically connected to the enable signal terminal, a first electrode of the ninth transistor is electrically connected to the second data signal terminal, and a second electrode of the ninth transistor is electrically connected to a first terminal of the second storage capacitor.

A control electrode of the tenth transistor is electrically connected to the enable signal terminal, a first electrode of the tenth transistor is electrically connected to a second electrode of the eleventh transistor, and a second electrode of the tenth transistor is electrically connected to the light-emitting sub-circuit. A control electrode of the eleventh transistor is electrically connected to the second terminal of the second storage capacitor, a first electrode of the eleventh transistor is connected to the driving signal control sub-circuit and a second terminal of the twelfth transistor, and the second electrode of the eleventh transistor is further electrically connected to a first electrode of the thirteenth transistor.

A control electrode of the twelfth transistor is electrically connected to a reset signal terminal, and a first electrode of the twelfth transistor is electrically connected to an initialization signal terminal. A control electrode of the thirteenth transistor is electrically connected to the reset signal terminal, and a second electrode of the thirteenth transistor is electrically connected to the second terminal of the second storage capacitor and the control electrode of the eleventh transistor.

In some embodiments, the eighth transistor, the ninth transistor, the tenth transistor, the eleventh transistor, the twelfth transistor, and the thirteenth transistors are all P-type transistors or N-type transistors.

In a second aspect, a pixel driving method is provided, which is applied to any one of the pixel driving circuits described in the first aspect. The pixel driving method includes: a frame period including a scanning phase and a working phase, the scanning phase including a plurality of row scanning periods. In each of the plurality of row scanning periods, the method includes: writing a first data signal to a driving signal control sub-circuit under a control of a first scanning signal terminal; and writing a second data signal with a set working potential to a driving duration control sub-circuit under a control of the second scanning signal terminal.

The working phase includes: providing, by the driving signal control sub-circuit, the driving signal to the driving duration control sub-circuit under control of the enable signal terminal, the driving signal being related to the first data signal and the first voltage signal provided by the first voltage signal terminal; receiving, by the driving duration control sub-circuit, a second data signal with a potential varying within a set range under the control of the enable signal terminal; and transmitting, by the driving duration control sub-circuit, the driving signal to the element to be driven, the duration for which the driving signal is transmitted to the element to be driven being related to the second data signal with the set working potential and the second data signal with the potential varying within the set range. The first data signal is different from the second data signal.

In some embodiments, an absolute value of the set working potential is related to a duration for which a corresponding element to be driven needs to work.

In some embodiments, two endpoint values in the set range are a non-working potential and a reference working potential of the second data signal respectively. An absolute value of the reference working potential is greater than or equal to a maximum value in absolute values of all set working potentials of the second data signal, and the set working potential is within the set range.

In a third aspect, a display panel is provided. The display panel includes pixel driving circuits according to the first aspect.

In some embodiments, the display panel includes a plurality of sub-pixels, and each sub-pixel corresponds to a pixel driving circuit, and the plurality of sub-pixels are arranged in an array of multiple rows and multiple columns. The display panel further includes a plurality of first scanning signal lines, a plurality of first data signal lines, a plurality of second scanning signal lines, and a plurality of second data signal lines. Pixel driving circuits corresponding to sub-pixels in a same row are electrically connected to a same first scanning signal line and a same second scanning signal line. Pixel driving circuits corresponding to sub-pixels in a same column are electrically connected to a same first data signal line and a same second data signal line.

In some embodiments, the display panel further includes a base substrate on which the pixel driving circuits are disposed, the base substrate being a glass substrate.

In a fourth aspect, a display device is provided. The display device includes the display panel according to the third aspect.

BRIEF DESCRIPTION OF THE DRAWINGS

In order to describe technical solutions in some embodiments of the present disclosure more clearly, the accompanying drawings to be used in some embodiments of the present disclosure will be introduced briefly below. Obviously, the accompanying drawings to be described below are merely some embodiments of the present disclosure, and a person of ordinary skill in the art can obtain other drawings according to these drawings.

DETAILED DESCRIPTION

Technical solutions in embodiments of the present disclosure will be described clearly and completely below in combination with accompanying drawings in the embodiments of the present disclosure. Obviously, the described embodiments are merely some but not all embodiments of the present disclosure. All other embodiments obtained on a basis of the embodiments of the present disclosure by a person of ordinary skill in the art shall be included in the protection scope of the present disclosure.

In the field of display technologies, a micro light-emitting diode (Micro LED) display device has a high brightness and wide color gamut, which can meet requirements of an application of a high-dynamic range (HDR) technology on brightness and color gamut of a display device, and thus is more suitable for implementing a HDR display.

In the related art, a pixel driving circuit in the micro LED display device usually adopts a current-driving control, in which a luminous intensity of a micro LED is controlled by controlling a magnitude of a driving current input to the micro LED, thereby implementing displays with different gray scales. For example, when a low gray scale display is implemented, a small driving current is provided to reduce a brightness of the micro LED, and when a high gray scale display is implemented, a large driving current is provided to improve the brightness of the micro LED.

Inventors of the present disclosure have found after research that, the micro LED has characteristics of a high luminous efficiency at a high current density, a low luminous efficiency at a low current density and a shifted main wave peak. Specifically, in a case where the driving current input to the micro LED reaches a certain value, the luminous efficiency of the micro LED reaches the highest; and in a case where the driving current has not reached the value, the luminous efficiency of the micro LED is always in a climbing phase, that is, as the provided driving current increases, the luminous intensity of the micro LED gradually increases, and the luminous efficiency gradually increases.

In this way, in a case where a driving method of controlling the luminous intensity of the micro LED by controlling the magnitude of the driving current in the related art is adopted, the driving current input to the micro LED is relatively low when the low gray scale display is implemented. As a result, the micro LED is at a low current density, which causes a low luminous efficiency and a high energy consumption of the micro LED, and a high power consumption when the display device displays an image, thereby causing an energy loss.

Figure 1:
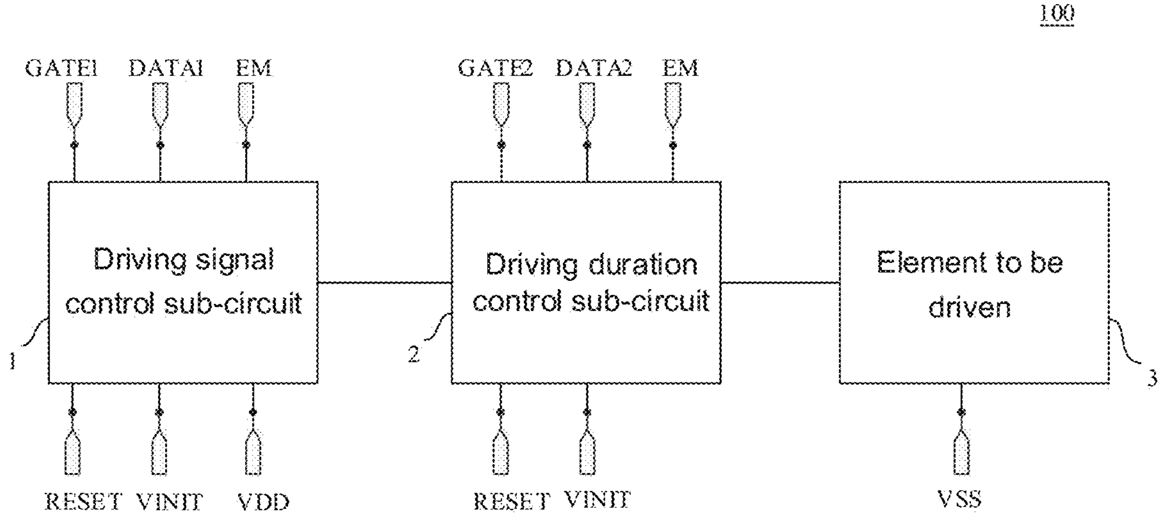
FIG. 1 is a schematic structural diagram of a pixel driving circuit, in accordance with some embodiments of the present disclosure.

Some embodiments of the present disclosure provide a pixel driving circuit 100. As shown in FIG. 1, the pixel driving circuit 100 includes a driving signal control sub-circuit 1 and a driving duration control sub-circuit 2.

The driving signal control sub-circuit 1 is electrically connected to a first scanning signal terminal GATE1, a first data signal terminal DATA1, a first voltage signal terminal VDD, an enable signal terminal EM, and the driving duration control sub-circuit 2. The first scanning signal terminal GATE1 is configured to receive a first scanning signal Gate1, and input the first scanning signal Gate1 to the driving signal control sub-circuit 1. The first data signal terminal DATA1 is configured to receive a first data signal Data1, and input the first data signal Data1 to the driving signal control sub-circuit 1. The first voltage signal terminal VDD is configured to receive a first voltage signal Vdd, and input the first voltage signal Vdd to the driving signal control sub-circuit 1. The enable signal terminal EM is configured to receive an enable signal Em, and input the enable signal Em to the driving signal control sub-circuit 1.

The driving signal control sub-circuit 1 is configured to provide a driving signal to the driving duration control sub-circuit 2 under control of the first scanning signal terminal GATE1 and the enable signal terminal EM. The driving signal is related to the first data signal Data1 received at the first data signal terminal DATA1 and the first voltage signal Vdd received at the first voltage signal terminal VDD.

The driving duration control sub-circuit 2 is further electrically connected to a second scanning signal terminal GATE2, a second data signal terminal DATA2, the enable signal terminal EM, and an element to be driven 3. The second scanning signal terminal GATE2 is configured to receive a second scanning signal Gate2, and input the second scanning signal Gate2 to the driving signal control sub-circuit 1. The second data signal terminal DATA2 is configured to receive a second data signal Data2, and input the second data signal Data2 to the driving duration control sub-circuit 2. The enable signal terminal EM is configured to receive the enable signal Em, and input the enable signal Em to the driving signal control sub-circuit 1.

The driving duration control sub-circuit 2 is configured to transmit the driving signal to the element to be driven 3 under control of the second scanning signal terminal GATE2 and the enable signal terminal EM. A duration for which the driving signal is transmitted to the element to be driven 3 is related to the second data signal DATA2 received at the second data signal terminal DATA2.

Therefore, the pixel driving circuit 100 includes the driving signal control sub-circuit 1 and the driving duration control sub-circuit 2. The driving signal control sub-circuit 1 is configured to provide the driving signal to the driving duration control sub-circuit 2, and a magnitude of the driving signal is related to the first data signal Data1 and the first voltage signal Vdd. The driving duration control sub-circuit 2 is configured to transmit the driving signal to the element to be driven 3, and the duration for which the driving signal is transmitted to the element to be driven 3 is related to the second data signal Data2, and when the driving signal is transmitted to the element to be driven 3, the element to be driven 3 works, that is, a working duration of the element to be driven 3 is related to the second data signal Data2.

In this way, under a combined action of the driving signal control sub-circuit 1 and the driving duration control sub-circuit 2, by controlling the magnitude of the driving signal and the duration for which the driving signal is transmitted to the element to be driven 3, the magnitude of the driving signal transmitted to the element to be driven 3 and the working duration of the element to be driven 3 may be controlled, thereby controlling the element to be driven 3.

In some embodiments, the element to be driven 3 is a light-emitting device, such as a micro LED. The driving signal control sub-circuit 1 controls a magnitude of a driving current transmitted to the light-emitting device by controlling the magnitude of the driving signal. The driving duration control sub-circuit 2 controls the duration for which the driving signal is transmitted to the light-emitting device by controlling the working duration of the light-emitting device. In this way, when displays with different gray scales are performed, a luminous intensity of the light-emitting device is changed by controlling the magnitude of the driving current transmitted to the light-emitting device and a light-emitting duration of the light-emitting device, thereby achieving the displays with corresponding gray scales.

The inventors of the present disclosure have found after research that, when at a large driving current, the light-emitting device, such as the micro LED, is at a high current density and has a high luminous efficiency and a low energy consumption. With the pixel driving circuit 100, when a high gray scale display is implemented, the luminous intensity of the light-emitting device is increased by increasing the driving current input to the light-emitting device; and when a low gray scale display is implemented, the luminous intensity of the light-emitting device is reduced by shortening the working duration of the light-emitting device, without a need to reduce the driving current input to the light-emitting device. In this way, the driving current transmitted to the light-emitting device is always large, and the light-emitting device is always at the high current density and has the high luminous efficiency, thereby reducing power consumption and saving a cost.

Figure 2:
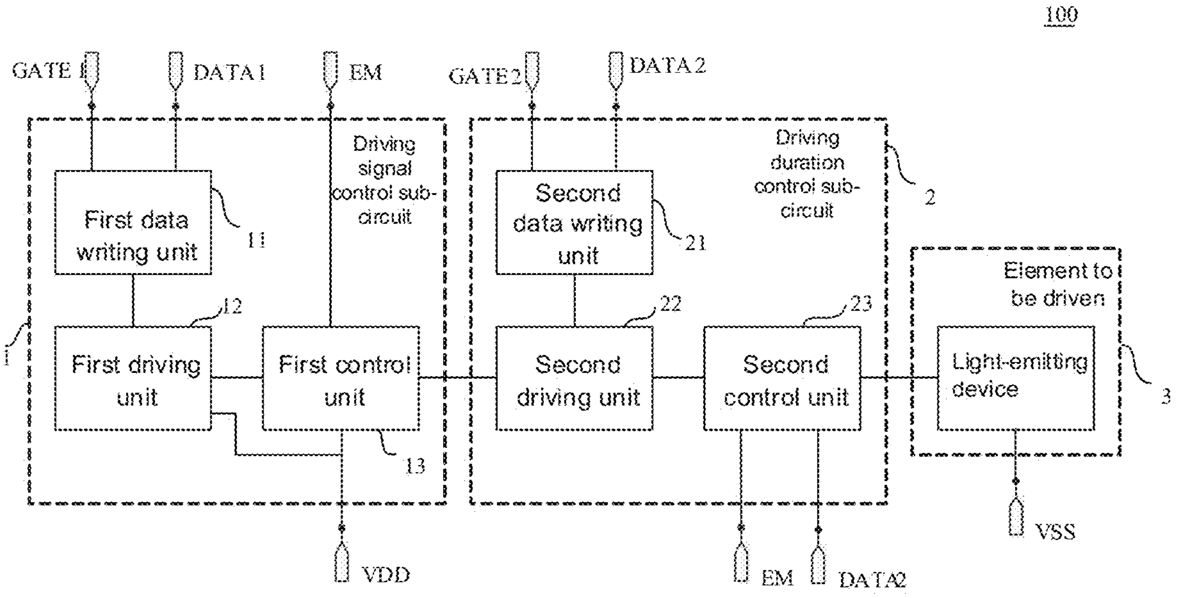
FIG. 2 is another schematic structural diagram of a pixel driving circuit, in accordance with some embodiments of the present disclosure.

In some embodiments, as shown in FIG. 2, the driving signal control sub-circuit 1 includes a first data writing unit 11, a first driving unit 12 and a first control unit 13.

The first data writing unit 11 is electrically connected to the first scanning signal terminal GATE1, the first data signal terminal DATA1 and the first driving unit 12, and is configured to write the first data signal Data1 received at the first data signal terminal DATA1 into the first driving unit 12 under control of the first scanning signal terminal GATE1.

The first driving unit 12 is further electrically connected to the first voltage signal terminal VDD and the first control unit 13, and is configured to generate a driving signal according to the written first data signal Data1 and the first voltage signal Vdd received at the first voltage signal terminal VDD, and transmit the driving signal to the first control unit 13.

The first control unit 13 is further electrically connected to the enable signal terminal EM, the first voltage signal terminal VDD and the driving duration control sub-circuit 2, and is configured to transmit the driving signal to the driving duration control sub-circuit 2 according to the first voltage signal Vdd under control of the enable signal terminal EM.

In the driving signal control sub-circuit 1, the first data signal Data1 is written into the first driving unit 12 by the first data writing unit 11; the first driving unit 12 generates the driving signal according to the first data signal Data1 and the first voltage signal Vdd, and transmits the driving signal to the first control unit 13; and the first control unit 13 transmits the driving signal to the driving duration control sub-circuit 2. Therefore, it is possible to achieve that the driving signal control sub-circuit 1 provides the driving signal to the driving duration control sub-circuit 2, and the driving signal is related to the first data signal Data1 and the first voltage signal Vdd.

Figure 3:
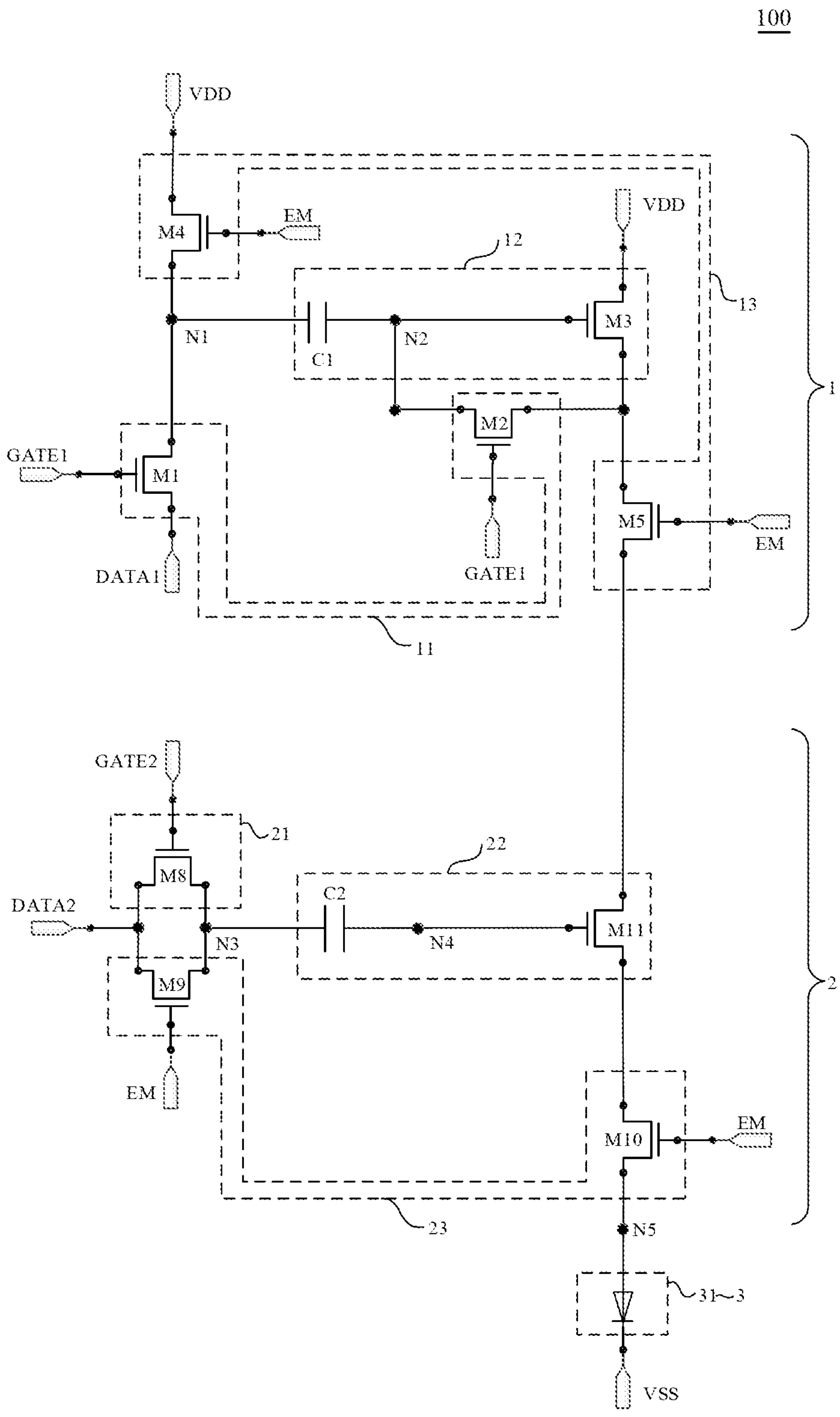
FIG. 3 is yet another schematic structural diagram of a pixel driving circuit, in accordance with some embodiments of the present disclosure.

For example, as shown in FIG. 3, the first data writing unit 11 includes a first transistor M1 and a second transistor M2.

A control electrode of the first transistor M1 is electrically connected to the first scanning signal terminal GATE1, a first electrode of the first transistor M1 is electrically connected to the first data signal terminal DATA1, and a second electrode of the first transistor M1 is electrically connected to the first driving unit 12. The first transistor M1 is configured to be turned on under control of the first scanning signal Gate1, so that the first data signal Data1 is transmitted to the first driving unit 12.

A control electrode of the second transistor M2 is electrically connected to the first scanning signal terminal GATE1, and a first electrode and a second electrode of the second transistor M2 are electrically connected to the first driving unit 12. In a case where the first driving unit 12 includes a third transistor M3, the second transistor M2 is configured to be turned on under the control of the first scanning signal Gate1, so that the third transistor M3 is in a self-saturation state.

The first driving unit 12 includes a first storage capacitor C1 and the third transistor M3.

A first terminal of the first storage capacitor C1 is electrically connected to the first data writing unit 11 and the first control unit 13, and a second terminal of the first storage capacitor C1 is electrically connected to the first data writing unit 11. The first storage capacitor C1 is configured to receive the first data signal Data1 input by the first data writing unit 11 and store the first data signal Data1.

A control electrode of the third transistor M3 is electrically connected to the second terminal of the first storage capacitor C1 and the first data writing unit 11, a first electrode of the third transistor M3 is electrically connected to the first voltage signal terminal VDD, and a second electrode of the third transistor M3 is electrically connected to the first data writing unit 11 and the first control unit 13. The third transistor M3 is configured to generate a driving signal according to the first data signal Data1 stored in the first storage capacitor C1 and the first voltage signal Vdd received at the first voltage signal terminal VDD, and transmit the driving signal to the first control unit 13.

The first control unit 13 includes a fourth transistor M4 and a fifth transistor M5.

A control electrode of the fourth transistor M4 is electrically connected to the enable signal terminal EM, a first electrode of the fourth transistor M4 is electrically connected to the first voltage signal terminal VDD, and a second electrode of the fourth transistor M4 is electrically connected to the first driving unit 12. The fourth transistor M4 is configured to be turned on under control of the enable signal Em, so that the first voltage signal Vdd is transmitted to the first driving unit 12.

A control electrode of the fifth transistor M5 is electrically connected to the enable signal terminal EM, a first electrode of the fifth transistor M5 is electrically connected to the first driving unit 12, and a second electrode of the fifth transistor M5 is electrically connected to the driving duration control sub-circuit 2. The fifth transistor M5 is configured to be turned on under the control of the enable signal Em, so that the driving signal is transmitted to the driving duration control sub-circuit 2.

Figure 4:
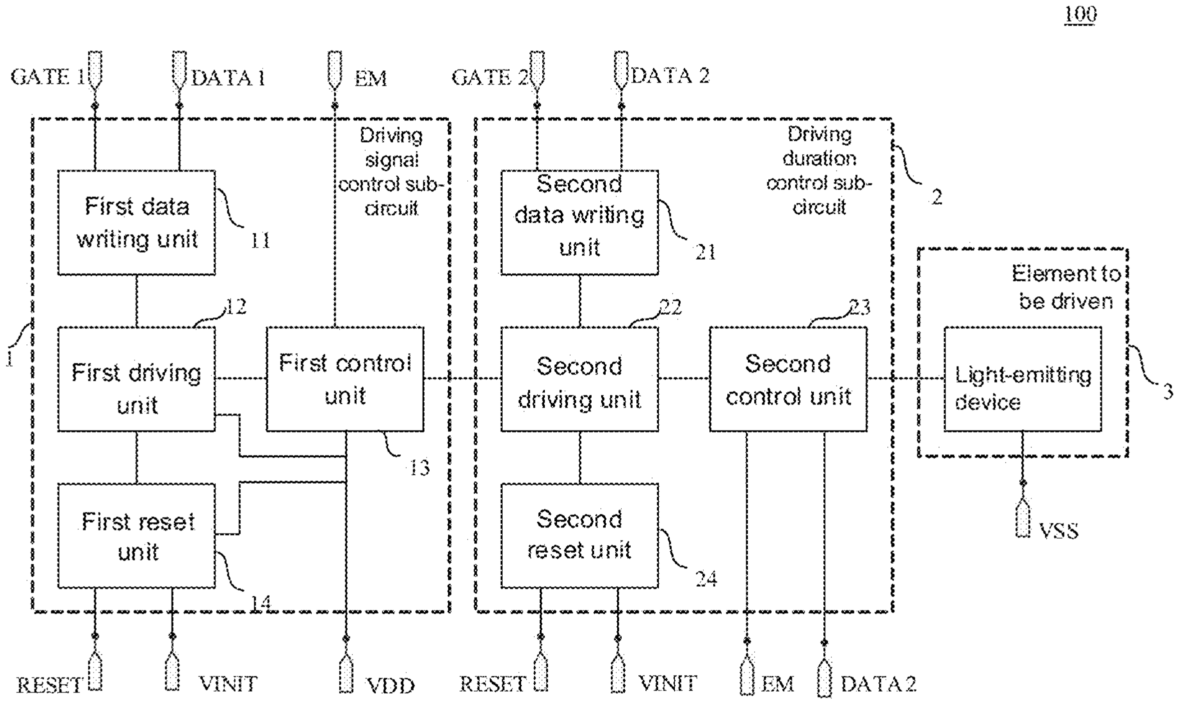
FIG. 4 is yet another schematic structural diagram of a pixel driving circuit, in accordance with some embodiments of the present disclosure.

In some embodiments, as shown in FIG. 4, the driving signal control sub-circuit 1 further includes a first reset unit 14.

The first reset unit 14 is electrically connected to the first voltage signal terminal VDD, a reset signal terminal RESET, an initialization signal terminal VINIT, and the first driving unit 12. The reset signal terminal RESET is configured to receive a reset signal Reset and input the reset signal Reset to the first reset unit 14. The initialization signal terminal VINIT is configured to receive an initialization signal Vinit and input the initialization signal Vinit to the first reset unit 14.

The first reset unit 14 is configured to reset a voltage of the first driving unit 12 according to the first voltage signal Vdd received at the first voltage signal terminal VDD and the initialization signal Vinit received at the initialization signal terminal VINIT under control of the reset signal terminal RESET.

In the above embodiments, the voltage of the first driving unit 12 is reset by the first reset unit 14 to reduce noise of a signal at the first driving unit 12, so that when the first data writing unit 11 writes the first data signal Data1 into the first driving unit 12, the input first data signal Data1 is more accurate.

Figure 5:
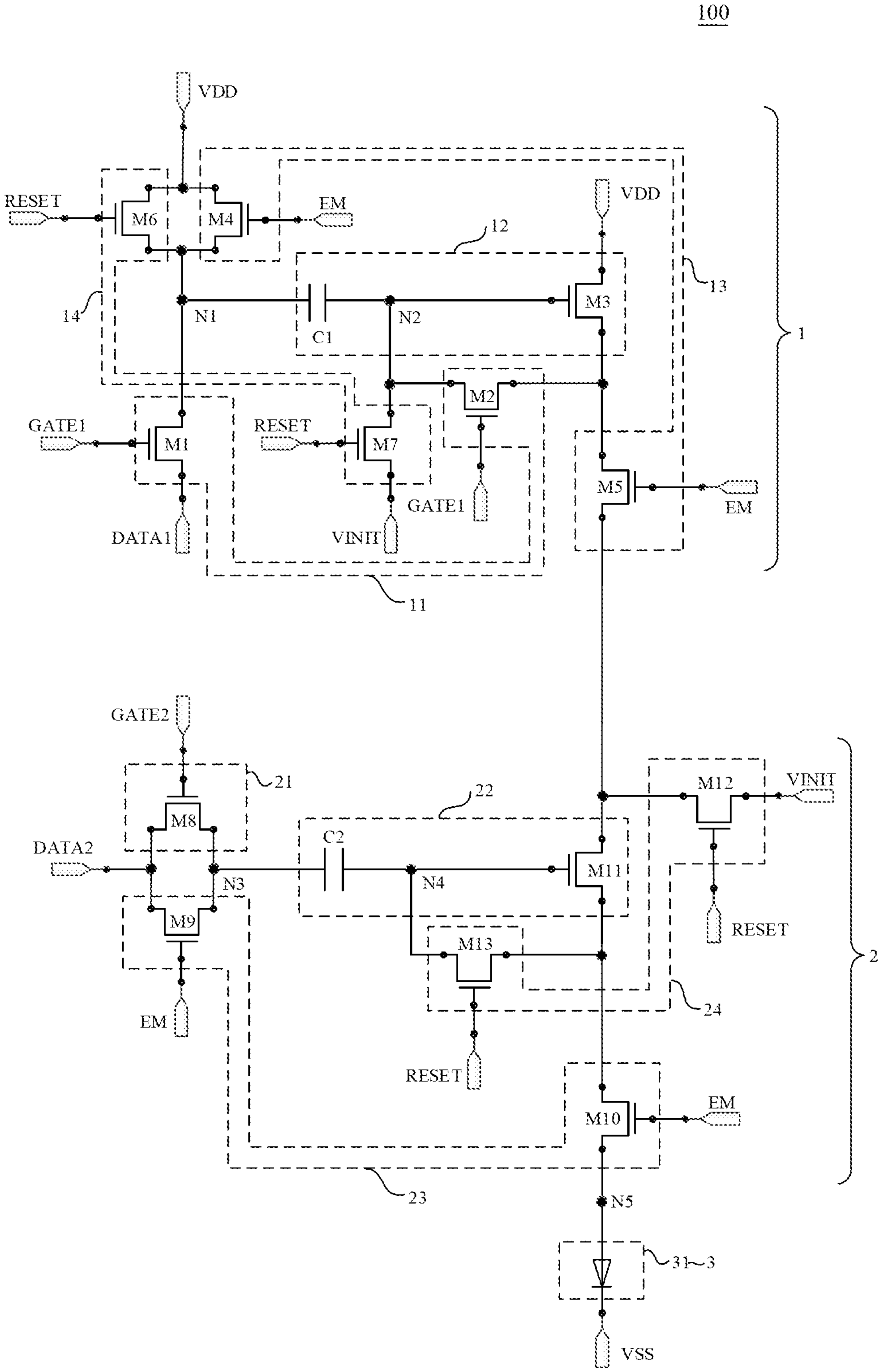
FIG. 5 is yet another schematic structural diagram of a pixel driving circuit, in accordance with some embodiments of the present disclosure.

For example, as shown in FIG. 5, the first reset unit 14 includes a sixth transistor M6 and a seventh transistor M7.

A control electrode of the sixth transistor M6 is electrically connected to the reset signal terminal RESET, a first electrode of the sixth transistor M6 is electrically connected to the first voltage signal terminal VDD, and a second electrode of the sixth transistor M6 is electrically connected to the first driving unit 12. The sixth transistor M6 is configured to be turned on under control of the reset signal Reset, so that the first voltage signal Vdd is transmitted to the first driving unit 12.

A control electrode of the seventh transistor M7 is electrically connected to the reset signal terminal RESET, a first electrode of the seventh transistor M7 is electrically connected to the initialization signal terminal VINIT, and a second electrode of the seventh transistor M7 is electrically connected to the first driving unit 12. The seventh transistor M7 is configured to be turned on under the control of the reset signal Reset, so that the initialization signal Vinit is transmitted to the first driving unit 12.

On this basis, a specific circuit structure of the driving signal control sub-circuit 1 included in the pixel driving circuit 100 provided by the embodiments of the present disclosure will be described generally and exemplarily below.

As shown in FIG. 5, the driving signal control sub-circuit 1 includes the first transistor M1, the second transistor M2, the third transistor M3, the fourth transistor M4, the fifth transistor M5, the sixth transistor M6, the seventh transistor M7, and the storage capacitor C1.

The control electrode of the first transistor M1 is electrically connected to the first scanning signal terminal GATE1, the first electrode of the first transistor M1 is electrically connected to the first data signal terminal DATA1, and the second electrode of the first transistor M1 is electrically connected to the first terminal of the first storage capacitor C1. The first transistor M1 is configured to be turned on under the control of the first scanning signal Gate1, so that the first data signal Date1 is transmitted to the first terminal of the first storage capacitor C1.

The control electrode of the second transistor M2 is electrically connected to the first scanning signal terminal GATE1, the first electrode of the second transistor M2 is electrically connected to the second electrode of the third transistor M3, and the second electrode of the second transistor M2 is electrically connected to the second terminal of the first storage capacitor C1 and the control electrode of the third transistor M3. The second transistor M2 is configured to be turned on under the control of the first scanning signal Gate1, so that the control electrode of the third transistor M3 is connected to the second electrode of the third transistor M3, and the third transistor M3 reaches the self-saturation state.

The control electrode of the third transistor M3 is further electrically connected to the second terminal of the first storage capacitor C1, the first electrode of the third transistor M3 is electrically connected to the first voltage signal terminal VDD, and the second electrode of the third transistor M3 is further electrically connected to the first electrode of the fifth transistor M5. The third transistor M3 is configured to generate the driving signal according to the first data signal Date1 stored in the first storage capacitor C1 and the first voltage signal Vdd, and transmit the driving signal to the first electrode of the fifth transistor M5.

The control electrode of the fourth transistor M4 is electrically connected to the enable signal terminal EM, the first electrode of the fourth transistor M4 is electrically connected to the first voltage signal terminal VDD, and the second electrode of the fourth transistor M4 is electrically connected to the first terminal of the first storage capacitor C1. The fourth transistor M4 is configured to be turned on under the control of the enable signal Em, so that the first voltage signal Vdd is transmitted to the first terminal of the first storage capacitor C1.

The control electrode of the fifth transistor M5 is electrically connected to the enable signal terminal EM, and the second electrode of the fifth transistor M5 is electrically connected to the driving duration control sub-circuit 2. The fifth transistor M5 is configured to be turned on under the control of the enable signal Em, so that the driving signal is transmitted to the driving duration control sub-circuit 2.

The control electrode of the sixth transistor M6 is electrically connected to the reset signal terminal RESET, the first electrode of the sixth transistor M6 is electrically connected to the first voltage signal terminal VDD, and the second electrode of the sixth transistor M6 is electrically connected to the first terminal of the first storage capacitor C1. The sixth transistor M6 is configured to be turned on under the control of the reset signal Reset, so that the first voltage signal Vdd is transmitted to the first terminal of the first storage capacitor C1.

The control electrode of the seventh transistor M7 is electrically connected to the reset signal terminal RESET, the first electrode of the seventh transistor M7 is electrically connected to the initialization signal terminal VINIT, and the second electrode of the seventh transistor M7 is electrically connected to the second terminal of the first storage capacitor C1 and the control electrode of the third transistor M3. The seventh transistor M7 is configured to be turned on under the control of the reset signal Reset, so that the initialization signal Vinit is transmitted to the second terminal of the first storage capacitor C1.

As shown in FIG. 5, in the driving signal control sub-circuit 1, the first voltage signal terminal VDD electrically connected to the fourth transistor M4 and the sixth transistor M6, and the first voltage signal terminal VDD electrically connected to the third transistor M3 are a same voltage signal terminal, and voltage signals received by the voltage signal terminal are all first voltage signals Vdd. In some embodiments, the voltage signal terminal electrically connected to the fourth transistor M4 and the sixth transistor M6 and the voltage signal terminal electrically connected to the third transistor M3 are two different voltage signal terminals, and voltage signals received by the two different voltage signal terminals are two voltage signals with different amplitudes. The present disclosure does not limit this.

In some embodiments, a node where the control electrode of the third transistor M3 is electrically connected to the second terminal of the first storage capacitor C1 is equivalent to a second node N2. That is, a potential at the second node N2 is the same as a potential at the second terminal of the first storage capacitor C1 and a potential at the control electrode of the third transistor M3. A node where the second electrode of the first transistor M1 is electrically connected to the first terminal of the first storage capacitor C1 is equivalent to a first node N1. That is, a potential at the first node N1 is the same as a potential at the first terminal of the first storage capacitor C1 and a potential at the second electrode of the first transistor M1.

In some embodiments, in the pixel driving circuit 100 provided by the present disclosure, the first transistor M1, the second transistor M2, the third transistor M3, the fourth transistor M4, the fifth transistor M5, the sixth transistor M6, and the seventh transistor M7 are all P-type transistors or N-type transistors.

In some embodiments, as shown in FIG. 2, the driving duration control sub-circuit 2 in the pixel driving circuit 100 provided by the present disclosure includes a second data writing unit 21, a second control unit 23, and a second driving unit 22.

The second data writing unit 21 is electrically connected to the second scanning signal terminal GATE2, the second data signal terminal DATA2, and the second driving unit 22, and is configured to write a second data signal Data2 with a set working potential received at the second data signal terminal DATA2 into the second driving unit 22 under control of the second scanning signal terminal GATE2.

It will be noted that, the duration for which the driving signal is transmitted to the element to be driven 3 is related to the second data signal Data2 with the set working potential. By controlling the set working potential of the second data signal Data2, the duration for which the driving signal is transmitted to the element to be driven 3 may be changed, thereby changing the working duration of the element to be driven 3.

The second control unit 23 is electrically connected to the enable signal terminal EM, the second data signal terminal DATA2, and the second driving unit 22, and is configured to transmit a second data signal DATA2 with a potential varying within a set range received at the second data signal terminal DATA2 to the second driving unit 22 under the control of the enable signal terminal EM.

It will be noted that, the duration for which the driving signal is transmitted to the element to be driven 3 is related to the second data signal Data2 with the potential varying within the set range. When the potential of the second data signal Data2 varies to a certain value, the second driving unit 22 is turned on, and the driving signal is transmitted to the second control unit 23 at this time.

The second driving unit 22 is further electrically connected to the driving signal control sub-circuit 1, and is configured to transmit the driving signal to the second control unit 23 and control a duration for which the driving signal is transmitted to the second control unit 23, according to the second data signal Data2 with the set working potential and the second data signal Data2 with the potential varying within the set range.

The second control unit 23 is further electrically connected to the element to be driven 3, and is further configured to transmit the driving signal to the element to be driven 3.

In the driving duration control sub-circuit 2, the second data signal Data2 with the set working potential is written into the second driving unit 22 by the second data writing unit 21; the second data signal Data2 with the potential varying within the set range is transmitted to the second driving unit 22 by the second control unit 23; and the driving signal is transmitted to the second control unit 23 by the second driving unit 22, and the duration for which the driving signal is transmitted to the second control unit 23 is controlled by the second driving unit 22, according to the second data signal Data2 with the set working potential and the second data signal Data2 with the potential varying within the set range. Therefore, it is possible to achieve an effect that the driving duration control sub-circuit 2 controls the duration for which the driving signal is transmitted to the second control unit 23, so as to control the working duration of the element to be driven 3, thereby controlling a working state of the element to be driven 3.

For example, as shown in FIG. 3, the second data writing unit 21 includes an eighth transistor M8.

A control electrode of the eighth transistor M8 is electrically connected to the second scanning signal terminal GATE2, a first electrode of the eighth transistor M8 is electrically connected to the second data signal terminal DATA2, and a second electrode of the eighth transistor M8 is electrically connected to the second driving unit 22. The eighth transistor M8 is configured to be turned on under control of the second scanning signal Gate2, so that the second data signal Data2 is transmitted to the second driving unit 22.

The second control unit 23 includes a ninth transistor M9 and a tenth transistor M10.

A control electrode of the ninth transistor M9 is electrically connected to the enable signal terminal EM, a first electrode of the ninth transistor M9 is electrically connected to the second data signal terminal DATA2, and a second electrode of the ninth transistor M9 is electrically connected to the second driving unit 22. The ninth transistor M9 is configured to be turned on under the control of the enable signal Em, so that the second data signal Data2 is transmitted to the second driving unit 22.

A control electrode of the tenth transistor M10 is electrically connected to the enable signal terminal EM, a first electrode of the tenth transistor M10 is electrically connected to the second driving unit 22, and a second electrode of the tenth transistor M10 is electrically connected to a light-emitting sub-circuit. The tenth transistor M10 is configured to be turned on under the control of the enable signal Em, so that the driving signal is transmitted to the element to be driven 3.

The second driving unit 22 includes a second storage capacitor C2 and an eleventh transistor M11.

A first terminal of the second storage capacitor C2 is electrically connected to the second data writing unit 21 and the second control unit 23, and is configured to receive the second data signal Data2 and store the second data signal Data2.

A control electrode of the eleventh transistor M11 is electrically connected to a second terminal of the second storage capacitor C2, a first electrode of the eleventh transistor M11 is electrically connected to the driving signal control sub-circuit 1, and a second electrode of the eleventh transistor M11 is electrically connected to the second control unit 23. The eleventh transistor M11 is configured to be turned on under control of a voltage of the second terminal of the second storage capacitor C2, so that the driving signal is transmitted to the tenth transistor M10.

In some embodiments, as shown in FIG. 4, the driving duration control sub-circuit 2 further includes a second reset unit 24.

The second reset unit 24 is electrically connected to the reset signal terminal RESET, the initialization signal terminal VINIT, and the second driving unit 22, and is configured to reset a voltage of the second driving unit 22 according to the initialization signal Vinit received at the initialization signal terminal VINIT under the control of the reset signal terminal RESET.

In the above embodiments, the voltage of the second driving unit 22 is reset by the second reset unit 24 to reduce noise of a signal at the second driving unit 22, so that when the second data writing unit 21 writes the second data signal Data2 into the second driving unit 22, the input second data signal Data2 is more accurate.

For example, as shown in FIG. 5, the second reset unit 24 includes a twelfth transistor M12 and a thirteenth transistor M13.

A control electrode of the twelfth transistor M12 is electrically connected to the reset signal terminal RESET, a first electrode of the twelfth transistor M12 is electrically connected to the initialization signal terminal VINIT, and a second electrode of the twelfth transistor M12 is electrically connected to the second driving unit 22. The twelfth transistor M12 is configured to be turned on under the control of the reset signal Reset, so that the initialization signal Vinit is transmitted to the second driving unit 22.

A control electrode of the thirteenth transistor M13 is electrically connected to the reset signal terminal RESET, and a first electrode and a second electrode of the thirteenth transistor M13 are electrically connected to the second driving unit 22. The thirteenth transistor M13 is configured to be turned on under the control of the reset signal Reset, so that the control electrode of the eleventh transistor M11 is connected to the second electrode of the eleventh transistor M11, and the eleventh transistor M11 is in a self-saturation state.

On this basis, a specific circuit structure of the driving duration control sub-circuit 2 included in the pixel driving circuit 100 provided by the embodiments of the present disclosure will be described generally and exemplarily below.

As shown in FIG. 5, the driving duration control sub-circuit 2 includes the eighth transistor M8, the ninth transistor M9, the tenth transistor M10, the eleventh transistor M11, the twelfth transistor M12, the thirteenth transistor M13, and the second storage capacitor C2.

The control electrode of the eighth transistor M8 is electrically connected to the second scanning signal terminal GATE2, the first electrode of the eighth transistor M8 is electrically connected to the second data signal terminal DATA2, and the second electrode of the eighth transistor M8 is electrically connected to the first terminal of the second storage capacitor C2. The eighth transistor M8 is configured to be turned on under the control of the second scanning signal Gate2, so that the second data signal Data2 is transmitted to the first terminal of the second storage capacitor C2.

The control electrode of the ninth transistor M9 is electrically connected to the enable signal terminal EM, the first electrode of the ninth transistor M9 is electrically connected to the second data signal terminal DATA2, and the second electrode of the ninth transistor M9 is electrically connected to the first terminal of the second storage capacitor C2. The ninth transistor M9 is configured to be turned on under the control of the enable signal Em, so that the second data signal Data2 is transmitted to the second storage capacitor C2.

The control electrode of the tenth transistor M10 is electrically connected to the enable signal terminal EM, the first electrode of the tenth transistor M10 is electrically connected to the second electrode of the eleventh transistor M11, and the second electrode of the tenth transistor M10 is electrically connected to the light-emitting sub-circuit. The tenth transistor M10 is configured to be turned on under the control of the enable signal Em, so that the driving signal is transmitted to the element to be driven 3.

The control electrode of the eleventh transistor M11 is electrically connected to the second terminal of the second storage capacitor C2, the first electrode of the eleventh transistor M11 is electrically connected to the driving signal control sub-circuit 1 and the second electrode of the twelfth transistor M12, and the second electrode of the eleventh transistor M11 is further electrically connected to the first electrode of the thirteenth transistor M13. The eleventh transistor M11 is configured to be turned on under the control of the voltage of the second terminal of the second storage capacitor C2, so that the driving signal is transmitted to the tenth transistor M10.

The control electrode of the twelfth transistors is electrically connected to the reset signal terminal RESET, and the first electrode of the twelve transistors is electrically connected to the initialization signal terminal VINIT. The twelfth transistor M12 is configured to be turned on under the control of the reset signal Reset, so that the initialization signal Vinit is transmitted to the second driving unit 22.

The control electrode of the thirteenth transistor M13 is electrically connected to the reset signal terminal RESET, and the second electrode of the thirteenth transistor M13 is electrically connected to the second terminal of the second storage capacitor C2 and the control electrode of the eleventh transistor M11. The thirteenth transistor M13 is configured to be turned on under the control of the reset signal Reset, so that the control electrode of the eleventh transistor M11 is connected to the second electrode of the eleventh transistor M11, and the eleventh transistor M11 is in the self-saturation state.

In some embodiments, the eighth transistor M8, the ninth transistor M9, the tenth transistor M10, the eleventh transistor M11, the twelfth transistor M12, and the thirteenth transistor M13 are all P-type transistors or N-type transistors.

The specific structures of the driving signal control sub-circuit 1 and the driving time control sub-circuit 2 have been exemplarily introduced above. In some embodiments, as shown in FIG. 5, the driving signal control sub-circuit 1 in the pixel driving circuit 100 provided by some embodiments of the present disclosure includes: the first transistor M1, the second transistor M2, the third transistor M3, the fourth transistor M4, the fifth transistor M5, the sixth transistor M6, the seventh transistor M7 and the first storage capacitor C1, and as for a connection manner of each element, reference may be made to the above description in the corresponding part. In addition, the driving duration control sub-circuit 2 in the pixel driving circuit 100 includes: the eighth transistor M8, the ninth transistor M9, the tenth transistor M10, the eleventh transistor M11, the twelfth transistor M12, the thirteenth transistor M13, and the second storage capacitor C2, and as for a connection manner of each element, reference may be made to the above description in the corresponding part. Each transistor described above may be a P-type transistor or an N-type transistor.

In some embodiments, as shown in FIGS. 3 and 5, the element to be driven 3 includes at least one light-emitting diode 31 connected in series in a current path. An anode of one of the at least one light-emitting diode 31 is electrically connected to the second electrode of the tenth transistor M10, and a node at which the anode of the light-emitting diode 31 is electrically connected to the second electrode of the tenth transistor M10 is equivalent to a fifth node N5. A cathode of the one of the at least one light-emitting diode 31 is electrically connected to a signal terminal. For example, the signal terminal is a second voltage signal terminal VSS. In a case where the tenth transistor M10 is a P-type transistor, the second voltage signal terminal VSS may be grounded, or at a voltage of 0 V.

In some embodiments, the light-emitting diode 31 is a micro LED, a mini light-emitting diode (mini LED), an organic light-emitting diode, a quantum dot light-emitting diode or any other light-emitting device having characteristics of a high luminous efficiency at a high current density and a low luminous efficiency at a low current density, which is not limited in the embodiments of the present disclosure.

It will be noted that, the transistors used in the circuits provided by the embodiments of the present disclosure may be thin film transistors, field-effect transistors or other switching devices with same characteristics, which is not limited in the embodiments of the present disclosure.

In some embodiments, the control electrode of each transistor used in the pixel driving circuit 100 is a gate of the transistor, the first electrode of the transistor is one of a source and a drain of the transistor, and the second electrode of the transistor is the other of the source and the drain of the transistor. Since the source and the drain of the transistor may be symmetrical in structure, there may be no difference in structure between the source and the drain of the transistor. That is to say, there may be no difference in structure between the first electrode and the second electrode of the transistor in the embodiments of the present disclosure. For example, in a case where the transistor is the P-type transistor, the first electrode of the transistor is the source, and the second electrode of the transistor is the drain. For example, in a case where the transistor is the N-type transistor, the first electrode of the transistor is the drain, and the second electrode of the transistor is the source.

In the embodiments of the present disclosure, specific implementations of the driving signal control sub-circuit 1 and the driving duration control sub-circuit 2 are not limited to those described above, and may be any implementations used, such as conventional implementations well known to a person skilled in the art, as long as corresponding functions may be implemented. The above examples do not limit the protection scope of the present disclosure. In practical applications, a person skilled in the art may choose to use or not to use one or more of the above circuits according to situations. Various combinations and modifications based on the above circuits do not depart from principles of the present disclosure, and details are not described herein again.

Figure 6:
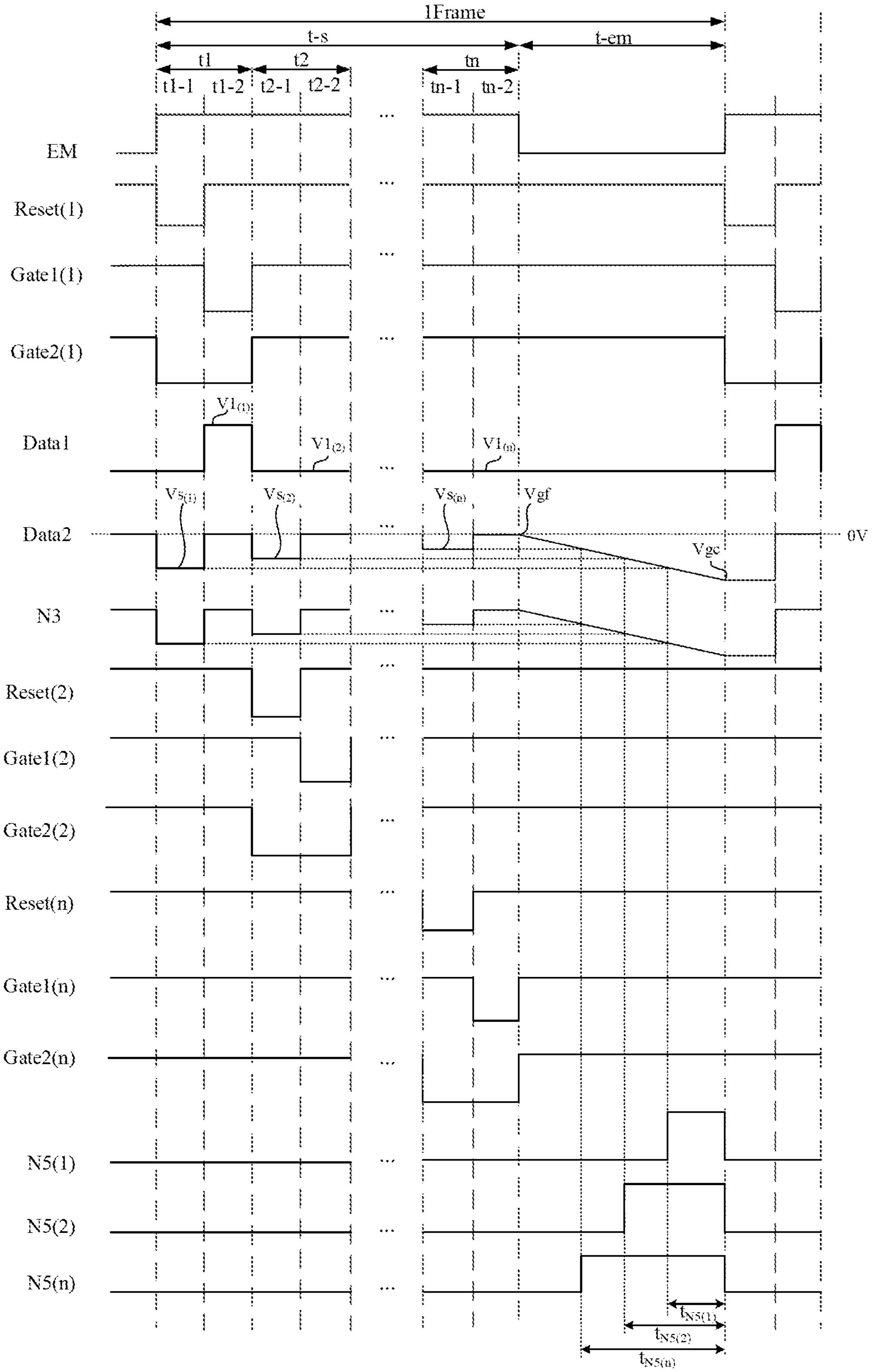
FIG. 6 is a timing diagram of a pixel driving method, in accordance with some embodiments of the present disclosure.

Some embodiments of the present disclosure provide a pixel driving method applied to the pixel driving circuit 100 described above. As shown in FIG. 6, the pixel driving method includes: a frame period (1 Frame) including a scanning phase t-s and a working phase t-em, and the scanning phase t-s including a plurality of row scanning periods. For example, the plurality of row scanning periods are n row scanning periods, and the n row scanning periods are t1 to tn, n is greater than or equal to 2.

Each of the plurality of row scanning periods t1 to tn includes S1 to S2.

In S1, the first data signal Data1 is writted to the driving signal control sub-circuit 1 writes under the control of the first scanning signal terminal GATE1.

In combination with FIG. 2, in a case where the driving signal control sub-circuit 1 includes the first data writing unit 11, the first driving unit 12, and the first control unit 13, the first data writing unit 11 is turned on under the control of the first scanning signal terminal GATE1, so that the first data signal Data1 received at the first data signal terminal DATA1 is written into the first driving unit 12.

For example, as shown in FIG. 3, in a case where the the first data writing unit 11 includes the first transistor M1 and the second transistor M2, the first driving unit 12 includes the first storage capacitor C1 and the third transistor M3, and the first control unit 13 includes the fourth transistor M4 and the fifth transistor M5, in each row scanning period, the first transistor M1 is turned on under the control of the first scanning signal Gate1, so that the first data signal Data1 received at the first data signal terminal DATA1 is transmitted to the first terminal of the first storage capacitor C1. In this case, the potential at the first terminal of the first storage capacitor C1 is a potential of the first data signal Data1.

The second transistor M2 is turned on under the control of the first scanning signal Gate1, so that the control electrode of the third transistor M3 is connected to the second electrode of the third transistor M3, and the third transistor M3 is in the self-saturation state. Then, a voltage of the control electrode of the third transistor M3 is a sum of a voltage of the first electrode of the third transistor M3 and a threshold voltage of the third transistor M3. The first electrode of the third transistor M3 is connected to the first voltage signal terminal VDD, and thus a potential at the first electrode of the third transistor M3 is a potential of the first voltage signal Vdd, and then the potential at the control electrode of the third transistor M3 is a sum of the potential of the first voltage signal Vdd and the threshold voltage of the third transistor M3.

The potential at the second terminal of the first storage capacitor C1 is the same as the potential at the control electrode of the third transistor M3, and then the potential at the second terminal of the first storage capacitor C1 is a sum of the potential of the first voltage signal Vdd and the threshold voltage of the third transistor M3. In this case, there is a difference between the potential at the first terminal and the potential at the second terminal of the first storage capacitor C1, thereby achieving charging of the first storage capacitor C1.

In S2, the second data signal Data2 having the set working potential is written to the driving duration control sub-circuit 2 under the control of the second scanning signal terminal GATE2.

In combination with FIG. 2, in a case where the driving duration control sub-circuit 2 includes the second data writing unit 21, the second control unit 23, and the second driving unit 22, the second data writing unit 21 is turned on under the control of the second scanning signal terminal GATE2, so that the second data signal Data2 received at the second data signal terminal DATA2 is written into the second driving unit 22. The second data signal Data2 has the set working potential which is related to the working duration of the element to be driven 3, and is determined by the working duration of the element to be driven 3.

For example, as shown in FIG. 3, in a case where the second data writing unit 21 includes the eighth transistor M8, the second control unit 23 includes the ninth transistor M9 and the tenth transistor M10, and the second driving unit 22 includes the second storage capacitor C2 and the eleventh transistor M11, in each row scanning period, the eighth transistor M8 is turned on under the control of the second scanning signal Gate2, so that the second data signal Data2 is transmitted to the first terminal of the second storage capacitor C2, and a potential at the first terminal of the second storage capacitor C2 is the set working potential of the second data signal Data2, thereby achieving charging of the second storage capacitor C2.

In an entire scanning period t-s, each of the n row scanning periods includes S1 and S2. In this way, sub-pixels in n rows are scanned, first data signals Data1 and second data signals Data2 of the sub-pixels in the n rows are written, and the first data signals Data1 and the second data signals Data2 are stored to prepare for output of driving signals in the working phase t-em.

The working phase t-em includes S3 and S4.

In S3, the driving signal control sub-circuit 1 provides the driving signal to the driving duration control sub-circuit 2 under the control of the enable signal terminal EM. The driving signal is related to the first data signal Data1 and the first voltage signal Vdd provided by the first voltage signal terminal VDD.

In combination with FIG. 2, in a case where the driving signal control sub-circuit 1 includes the first data writing unit 11, the first driving unit 12, and the first control unit 13, the first control unit 13 is turned on under the control of the enable signal terminal EM, so that the driving signal is transmitted to the driving duration control sub-circuit 2.

For example, as shown in FIG. 3, in a case where the the first data writing unit 11 includes the first transistor M1 and the second transistor M2, the first driving unit 12 includes the first storage capacitor C1 and the third transistor M3, and the first control unit 13 includes the fourth transistor M4 and the fifth transistor M5, in the working phase t-em, the fourth transistor M4 is turned on under the control of the enable signal terminal EM, so that the first voltage signal received at the first voltage signal terminal VDD is transmitted to the first terminal of the first storage capacitor C1, and the potential at the first terminal of the first storage capacitor C1 is changed to be the potential of the first voltage signal Vdd.

According to law of conservation of electric charge of capacitors, the difference between the potential at the first terminal and the potential at the second terminal of the first storage capacitor C1 remains unchanged. Since the potential at the first terminal of the first storage capacitor C1 is suddenly changed from the potential of the first data signal Data1 to the potential of the first voltage signal Vdd, the potential at the second terminal of the first storage capacitor C1 is also suddenly changed accordingly.

Then, the third transistor M3 is turned on and generates a driving current, and the driving current is output from the second electrode of the third transistor M3. The fifth transistor M5 is turned on under the control of the enable signal terminal EM, so that the driving signal is transmitted to the driving duration control sub-circuit 2. That is, the driving current generated by the third transistor M3 is transmitted to the driving duration control sub-circuit 2 via the fifth transistor M5.

In S4, the driving duration control sub-circuit 2 receives the second data signal Data2 with the potential varying within the set range under the control of the enable signal terminal EM, and transmits the driving signal to the element to be driven 3. The duration for which the driving signal is transmitted to the element to be driven 3 is related to the second data signal Data2 with the set working potential and the second data signal Data2 with the potential varying within the set range.

In combination with FIG. 2, in the case where the driving duration control sub-circuit 2 includes the second data writing unit 21, the second control unit 23, and the second driving unit 22, the second control unit 23 is turned on under the control of the enable signal terminal EM, so that the second data signal Data2 with the potential varying within the set range is written into the second driving unit 22. A voltage of the second data signal Data2 varies within a set range. In a case where the voltage of the second data signal Data2 varies to a specific voltage value, the second driving unit 22 is turned on, so that the driving signal is transmitted to the first control unit 13, and the driving signal is transmitted to the element to be driven 3 by the first control unit 13, thereby making the element to be driven 3 start to work. The specific voltage value is related to the set working potential.

For example, as shown in FIG. 3, in the case where the second data writing unit 21 includes the eighth transistor M8, the second control unit 23 includes the ninth transistor M9 and the tenth transistor M10, and the second driving unit 22 includes the second storage capacitor C2 and the eleventh transistor M11, in the working phase, the ninth transistor M9 is turned on under the control of the enable signal terminal EM, so that the second data signal with the potential varying within the set range is transmitted to the first terminal of the second storage capacitor C2, and the potential at the first terminal of the second storage capacitor C2 is the potential of the second data signal Data2, and the potential varies within the set range.

According to the law of conservation of electric charge of the capacitors, in order to keep the difference between the potential at the first terminal and the potential at the second terminal of the second storage capacitor C2 unchanged, the potential at the second terminal of the second storage capacitor C2 also varies accordingly when the potential at the first terminal of the second storage capacitor C2 varies. A potential at the control electrode of the eleventh transistor M11 is the same as the potential at the second terminal of the second storage capacitor C2, and thus the potential at the control electrode of the eleventh transistor M11 also varies. In a case where an absolute value of a gate-to-source voltage (a difference between the potential at the control electrode and a potential at the first electrode) of the eleventh transistor M11 is greater than a threshold voltage of the eleventh transistor M11, the eleventh transistor M11 is turned on, so that the driving signal is transmitted to the first electrode of the tenth transistor M10.

The tenth transistor M10 is turned on under the control of the enable signal terminal EM, so that the driving signal is transmitted to the element to be driven 3, and then the element to be driven 3 starts to work.

In the above pixel driving method, in a frame period (1 Frame), the first data signals Data1 and the second data signals Data2 of the sub-pixels in the rows are written in the scanning phase t-s. In the working phase t-em, the driving signals are generated and output, and durations for which the driving signals are transmitted to the element to be driven 3 are controlled. In this way, the element to be driven 3 is controlled by controlling magnitudes of the driving signals and the working duration of the element to be driven 3.

In some embodiments, the element to be driven 3 is the light-emitting device. By using the above pixel driving method, the luminous intensity of the light-emitting device is changed by controlling the magnitude of the driving current transmitted to the light-emitting device and the light-emitting duration of the light-emitting device, thereby achieving the displays with corresponding gray scales. When the high gray scale display is implemented, the luminous intensity of the light-emitting device is improved by increasing the driving current input to the light-emitting device. When the low gray scale display is implemented, the luminous intensity of the light-emitting device is reduced by shortening the working duration of the light-emitting device, without the need to reduce the driving current input to the light-emitting device. In this way, the driving current transmitted to the light-emitting device is always large, and the light-emitting device is always at the high current density and has the high luminous efficiency, thereby reducing the power consumption and saving the cost.

In some embodiments, the pixel driving method further includes: in each row scanning period, resetting, by the first reset unit 14, the voltage of the first driving unit 12 under the control of the reset signal terminal RESET; and resetting, by the second reset unit 24, the voltage of the second driving unit 22 under the control of the reset signal terminal RESET.

For example, as shown in FIG. 5, in a case where the first reset unit 14 includes the sixth transistor M6 and the seventh transistor M7, the sixth transistor M6 is turned on under the control of the reset signal Reset, so that the first voltage signal Vdd is transmitted to the first driving unit 12, and the seventh transistor M7 is turned on under the control of the reset signal Reset, so that the initialization signal Vinit is transmitted to the first driving unit 12, thereby resetting the voltage of the first driving unit 12.

In a case where the second reset unit 24 includes the twelfth transistor M12 and the thirteenth transistor M13, the thirteenth transistor M13 is turned on under the control of the reset signal terminal RESET, and the twelfth transistor M12 is turned on under the control of the reset signal Reset, so that the initialization signal Vinit is transmitted to the second driving unit 22, thereby resetting the voltage of the second driving unit 22.

In the above embodiments, in each row scanning period, by resetting the voltage of the first driving unit 12 by the first reset unit 14, and resetting the voltage of the second driving unit 22 by the second reset unit 24, the noise of the signal at the first driving unit 12 and the noise of the signal at the second driving unit 22 are reduced, and the first data signal Data1 input to the first driving unit 12 and the second data signal Data2 input to the second driving unit 22 are free from interference and are more accurate.

In some embodiments, an absolute value of a set working potential is related to a duration for which a corresponding element to be driven 3 needs to work. An absolute value of a set working potential that a second data signal Data2 written into each pixel driving circuit 100 has is related to a duration for which an element to be driven 3 driven by the pixel driving circuit 100 needs to work. In a case where the element to be driven 3 is the light-emitting device, the absolute value of the set working potential that the second data signal Data2 written into each pixel driving circuit 100 has is related to the duration for which the light-emitting device corresponding to the pixel driving circuit 100 needs to emit light. The light-emitting duration of the light-emitting device may be controlled by changing the absolute value of the set working potential, thereby controlling a gray scale of a sub-pixel.

On this basis, the pixel driving method provided by some embodiments of the present disclosure will be described generally and exemplarily below. The following description will be made by taking the pixel driving circuit 100 shown in FIG. 5 as an example in combination with the timing diagram of signals shown in FIG. 6. The pixel driving circuit 100 includes the first transistor M1, the second transistor M2, the third transistor M3, a fourth transistor M4, the fifth transistor M5, the sixth transistor M6, the seventh transistor M7, the eighth transistor M8, the ninth transistor M9, the tenth transistor M10, the eleventh transistor M11, the twelfth transistor M12, the thirteenth transistor M13, the first storage capacitor C1 and the second storage capacitor C2. In addition, the transistors are all the P-type transistors, and the element to be driven 3 includes a light-emitting diode 31.

As shown in FIG. 6, the pixel driving method includes: a frame period (1 Frame) including the scanning phase t-s and the working phase t-em, the scanning phase t-s including the plurality of row scanning periods t1 to tn, and each of the plurality of row scanning periods t1 to tn including a first sub-period and a second sub-period. For example, a first row scanning period t1 includes a first sub-period t1-1 and a second sub-period t1-2, a second row scanning period t2 includes a first sub-period t2-1 and a second sub-period t2-2, and so on, and an nth row scanning period tn includes a first sub-period tn-1 and a second sub-period tn-2.

It will be noted that, in a case where a display device includes n rows and m columns of sub-pixels and each sub-pixel corresponds to a pixel driving circuit 100, in the scanning phase t-s, sub-pixels in a first row to an nth row are scanned row by row, and first data signals Data1 and different second data signals Data2 are sequentially written into pixel driving circuits 100 corresponding to sub-pixels in each row; after the sub-pixels in the first row to the nth row are scanned row by row, the working phase t-em is started; and in the working phase t-em, pixel driving circuits 100 corresponding to the sub-pixels in the n rows and m columns simultaneously receive same second data signals Data2, and a potential of a second data signal Data2 written into the pixel driving circuit 100 corresponding to each sub-pixel varies within the set range.

In each row scanning period, different first data signals Data1 are simultaneously written into m pixel driving circuits 100 corresponding to m sub-pixels in a same row. That is to say, the first data signals Data1 are a group of signals. Different second data signals Data2 are simultaneously written into the m pixel driving circuits 100 corresponding to the m sub-pixels in the same row. That is to say, the second data signals Data2 are a group of signals. The first data signals Data1 and the second data signals Data2 written into the m pixel driving circuits 100 corresponding to the m sub-pixels in the same row are related to gray scales that the corresponding sub-pixels need to display. The following description is made by taking pixel driving circuits 100 corresponding to sub-pixels in a first column as an example.

In the scanning phase t-s, the potential of the first data signal Data1 transmitted by the first data signal terminal DATA1 is referred to as V1. A potential of the first data signal Data1 is V1(1) in the first row scanning period t1, a potential of the first data signal Data1 is V1(2) in the second row scanning period t2, and so on, and a potential of the first data signal Data1 is V1(n) in the nth row scanning period tn.

In the first sub-period in each row scanning period, a potential of the second data signal Data2 transmitted by the second data signal terminal DATA2 is referred to as the set working potential Vs. A set working potential of the second data signal Data2 is Vs(1) in the first sub-period t1-1 in the first row scanning period t1, a set working potential of the second data signal Data2 is Vs(2) in the first sub-period t2-1 in the second row scanning period t2, and so on, and a potential of the second data signal Data2 is Vs(n) in the first sub-period tn-1 in the nth row scanning period tn.

In the second sub-period in each row scanning period, a potential of the second data signal Data2 transmitted by the second data signal terminal DATA2 is referred to as Vs'.

In the working phase t-em, a potential of the second data signal Data2 transmitted by the second data signal terminal DATA2 is referred to as Vg, and the potential Vg varies within the set range. Potentials Vg of the written second data signals vary within set ranges from the first row to the nth row, and the set ranges corresponding to the sub-pixels in the rows are the same.

In the first sub-period t1-1 in the first row scanning period t1 in the scanning phase t-s, a driving process of a pixel driving circuit corresponding to a first sub-pixel in the first row is as follows.

The reset signal Reset transmitted by the reset signal terminal RESET and the second scanning signal Gate2 transmitted by the second scanning signal terminal GATE2 are low level signals. The first scanning signal Gate1 transmitted by the first scanning signal terminal GATE1 and the enable signal Em transmitted by the enable signal terminal EM are high level signals. The sixth transistor M6, the seventh transistor M7, the twelfth transistor M12, and the thirteenth transistor M13 are turned on under the control of the reset signal Reset, the eighth transistor M8 is turned on under the control of the second scanning signal Gate2, and remaining transistors are all turned off.

The sixth transistor M6 transmits the first voltage signal Vdd received at the first voltage signal terminal VDD to the first terminal of the first storage capacitor C1. In this case, the potential at the first terminal of the first storage capacitor C1 (the potential at the first node N1) is the potential Vd of the first voltage signal Vdd.

The seventh transistor M7 transmits the initialization signal Vinit received at the initialization signal terminal VINIT to the second terminal of the first storage capacitor C1. In this case, the potential at the second terminal of the first storage capacitor C1 (the potential at the second node N2) is a potential of the initialization signal Vinit. For example, the potential of the initialization signal Vinit is 0 V.

The eighth transistor M8 transmits the second data signal DATA2 received at the second data signal terminal DATA2 to the first terminal of the second storage capacitor C2. In this case, the potential at the first terminal of the second storage capacitor C2 (a potential at a third node N3) is the same as the potential of the second data signal DATA2, which is the set working potential Vs (1).

The twelfth transistor M12 transmits the initialization signal Vinit received at the initialization signal terminal VINIT to the first electrode of the eleventh transistor M11, and a potential at the first electrode of the eleventh transistor M11 is the potential of the initialization signal Vinit. The transistor M13 is turned on, so that the control electrode of the eleventh transistor M11 is connected to the second electrode of the eleventh transistor M11, and the eleventh transistor M11 is in the self-saturation state. In this case, the potential at the control electrode of the eleventh transistor M11 is a sum of the potential at the first electrode of the eleventh transistor M11 (the potential of the initialization signal Vinit) and the threshold voltage Vth2 of the eleventh transistor M11. For example, if the potential of the initialization signal Vinit is 0 V, the potential at the control electrode of the eleventh transistor M11 is Vth2, and the potential at the second terminal of the second storage capacitor C2 (a potential at a fourth node N4) is also Vth2.

In the second sub-period t1-2 in the first row scanning period t1 in the scanning phase t-s, a driving process of the pixel driving circuit corresponding to the first sub-pixel in the first row is as follows.

The first scanning signal Gate1 transmitted by the first scanning signal terminal GATE1 and the second scanning signal Gate2 transmitted by the second scanning signal terminal GATE2 are low level signals. The reset signal Reset transmitted by the reset signal terminal RESET and the enable signal Em transmitted by the enable signal terminal EM are high level signals. The first transistor M1 and the second transistor M2 are turned on under the control of the first scanning signal Gate1, the eighth transistor M8 is turned on under the control of the second scanning signal Gate2, and remaining transistors are all turned off.

The first transistor M1 transmits the first data voltage received at the first data signal terminal DATA1 to the first terminal of the first storage capacitor C1. In this case, the potential at the first terminal of the first storage capacitor C1 (the potential at the first node N1) is the potential V1(1) of the first data signal Data1.

The second transistor M2 is turned on, so that the control electrode of the third transistor M3 is connected to the second electrode of the third transistor M3, and the third transistor M3 is in the self-saturation state. The potential at the control electrode of the third transistor M3 is the sum of the potential at the first electrode of the third transistor M3 and the threshold voltage Vth1 of the third transistor M3. The potential at the first electrode of the third transistor M3 is the potential Vd of the first voltage signal Vdd, and then the potential at the control electrode of the third transistor M3 is a sum of Vd and Vth1 (i.e., Vd+Vth1), and the potential at the second terminal of the first storage capacitor C1 (the potential at the second node N2) is also the sum of Vd and Vth1 (i.e., Vd+Vth1).

The eighth transistor M8 transmits the second data signal Data2 received at the second data signal terminal DATA2 to the first terminal of the second storage capacitor C2. In this case, the potential at the first terminal of the second storage capacitor C2 (the potential at the third node N3) is the same as the potential Vs' of the second data signal Data2. For example, in this vase, the potential Vs' of the second data signal is 0 V.

In the first sub-period t1-1, the potential at the first terminal of the second storage capacitor C2 is the set working potential Vs(1), and the potential at the second terminal of the second storage capacitor C2 is Vth2. According to the law of conservation of electric charge of the capacitors, the difference between the potential at the first terminal and the potential at the second terminal of the second storage capacitor C2 remains unchanged. Then, in the second sub-period t1-2, the potential at the first terminal of the second storage capacitor C2 is suddenly changed to 0 V, and the potential at the second terminal of the second storage capacitor C2 is suddenly changed to a difference of Vth2 and Vs(1) (i.e., Vth2−Vs(1)).

Driving processes of pixel driving circuits 100 corresponding to sub-pixels in a second row to the nth row are the same as driving processes of pixel driving circuits 100 corresponding to the sub-pixels in the first row. As for descriptions of the second row scanning period t2 to the nth row scanning period tn in the scanning phase t-s, reference is made to the description of the first row scanning period t1.

After the sub-pixels in the first row to the nth row are scanned row by row, the sub-pixels in each row in the display device enters the working phase t-em. A driving process of the first sub-pixel in the first row in the working phase t-em is as follows.

The enable signal Em transmitted by the enable signal terminal EM is a low level signal. The first scanning signal Gate1 transmitted by the first scanning signal terminal GATE1, the second scanning signal Gate2 transmitted by the second scanning signal terminal GATE2, and the reset signal Reset transmitted by the reset signal terminal RESET are high level signals. The fourth transistor M4, the fifth transistor M5, and the tenth transistors M9 and M10 are turned on under the control of the enable signal EM, and remaining transistors are all turned off.

The fourth transistor M4 transmits the first voltage signal Vdd received at the first voltage signal terminal VDD to the first terminal of the first storage capacitor C1. In this case, the potential at the first terminal of the first storage capacitor C1 (the potential at the first node N1) is the potential Vd of the first voltage signal Vdd.

In the second sub-period t1-2 in the first row scanning period t1, the potential at the first terminal of the first storage capacitor C1 is the potential V1(1) of the first data signal Data1, and the potential at the second terminal of the first storage capacitor C1 is the sum of Vd and Vth1 (i.e., Vd+Vth1). According to the law of conservation of electric charge of the capacitors, the difference between the potential at the first terminal and the potential at the second terminal of the first storage capacitor C1 remains unchanged. Then, in the working phase t-em, the potential at the first terminal of the first storage capacitor C1 is changed to Vd, and the potential at the second terminal of the first storage capacitor C1 is changed to a sum of, a difference of, a product of 2 and Vd, and V1(1), and Vth1 (i.e., 2Vd−V1(1)+Vth1).

The third transistor M3 generates a driving current according to the first voltage signal Vdd and the potential at the second terminal of the second storage capacitor C2.

The fifth transistor M5 is turned on, so that the driving current generated by the third transistor M3 is transmitted to the first electrode of the eleventh transistor M11.

The ninth transistor M9 transmits the second data signal DATA2 received at the second data signal terminal DATA2 to the first terminal of the second storage capacitor C2. In this case, the potential at the first terminal of the second storage capacitor C2 (the potential at the third node N3) is the potential Vg of the second data signal Data2, and the potential Vg of the second data signal Data2 varies within the set range.

In some embodiments, two endpoint values in the set range are a non-working potential Vgf and a reference working potential Vgc of the second data signal Data2. An absolute value of the reference working potential Vgc is greater than or equal to a maximum value in absolute values of all set working potentials Vs of the second data signal Data2. The set working potential Vs is within the set range.

For example, the non-working potential Vgf of the second data signal Data2 is 0 V. In the working phase t-em, the potential Vg of the second data signal gradually varies from the non-working potential Vgf (0 V) to the reference working potential Vgc, and the potential at the first terminal of the second storage capacitor C2 (the potential at the third node N3) also gradually varies from the non-working potential Vgf (0 V) to the reference working potential Vgc.

According to the law of conservation of electric charge of the capacitors, the difference between the potential at the first terminal and the potential at the second terminal of the second storage capacitor C2 remains unchanged. In the second sub-period t1-2 in the first row scanning period t1, the potential at the first terminal of the second storage capacitor C2 is changed to 0 V, and the potential at the second terminal of the second storage capacitor C2 is the difference of Vth2 and Vs(1) (i.e., Vth2−Vs(1)). The difference between the potential at the first terminal and the potential at the second terminal of the second storage capacitor C2 is a difference of Vs(1) and Vth2 (i.e., Vs(1)−Vth2), and then in the working phase t-em, the potential at the second terminal of the second storage capacitor C2 (the potential at the fourth node N4) gradually varies from the difference of Vth2 and Vs(1) (i.e., Vth2−Vs(1)) to a sum of, the difference of Vth2 and Vs(1), and Vgc (i.e., Vth2−Vs(1)+Vgc).

In a process that the potential at the second terminal of the second storage capacitor C2 varies, the potential at the control electrode of the eleventh transistor M11 (the potential at the fourth node N4) also gradually varies from the difference of Vth2 and Vs(1) (i.e., Vth2−Vs(1)) to the sum of, the difference of Vth2 and Vs(1), and Vgc (i.e., Vth2−Vs(1)+Vgc). In a case where the potential at the control electrode of the eleventh transistor M11 varies to a certain potential, the eleventh transistor M11 may be turned on. The certain potential is set as a turn-on potential Vk which meets the following condition: the gate-to-source voltage of the eleventh transistor M11 Vgs is a difference of Vk and Vd(1) (i.e., Vgs=Vk−Vd(1)), where Vd(1) is a potential of the first voltage signal Vdd after passing through the third transistor M3. In a case where the absolute value of the gate source voltage of the eleventh transistor M11 is greater than or equal to an absolute value of the threshold voltage Vth2 of the eleventh transistor M11, the eleventh transistor M11 is turned on. That is, in a case where the turn-on potential Vk satisfies a condition that the absolute value of the difference of Vk and Vd(1) is greater than or equal to the absolute value of Vth2 (i.e., |Vk−Vd(1)|≥|Vth2|, and a condition that Vk is less than or equal to a sum of Vth2 and Vd(1) (i.e., Vk≤Vth2+Vd(1)), the eleventh transistor M11 is turned on, so that the driving signal passes. Before that, the eleventh transistor M11 is turned off, and thus the driving signal cannot pass.

For example, with reference to FIG. 6, in a case where the potential Vg of the second data signal Data2 varies from the non-working potential Vgf (0 V) to the set working potential Vs(1) in the first sub-period t1-1 in the first row scanning period t1, the potential at the first terminal of the second storage capacitor C2 is Vs(1), and the potential at the second terminal of the second storage capacitor C2 is Vth2, that is, the potential at the control electrode of the eleventh transistor M11 is Vth2. Since Vth2 is less than or equal to the sum of Vth2 and Vd(1) (i.e., Vk≤Vth2+Vd(1)), which meets the condition for the turn-on potential Vk, the eleventh transistor M11 is turned on. Thereafter, during a period when the potential Vg of the second data signal Data2 varies from the set working potential Vs(1) to the reference working potential Vgc, the eleventh transistor M11 is kept in a turn-on state, so that the driving signal is transmitted to the tenth transistor M10 until an end of the working phase.

The absolute value of the reference working potential Vgc is greater than or equal to the maximum value in the absolute values of all the set working potentials Vs of the second data signal Data2. For example, as shown in FIG. 6, with reference to the above description of the sub-pixels in the first row in the working phase t-em, the absolute value of the reference working potential Vgc is greater than an absolute value of the set working potential Vs(1) of the second data signal Data2 in the first sub-period t1-1 in the first row scanning period t1. In this way, it is possible to ensure that in the working phase t-em, in a process that the potential Vg of the second data signal Data2 gradually varies from the non-working potential Vgf to the reference working potential Vgc, the eleventh transistor M11 is turned on when the turn-on potential Vk (e.g., the set working potential Vs(1)) is reached, so that the driving signal may be transmitted. Similarly, as for the sub-pixels in the second row to the nth row, the absolute value of the reference working potential Vgc of the second data signal Data2 in the working phase t-em is greater than or equal to absolute values of the set working potentials Vs(2), Vs(3) . . . , and Vs(n) of the second data signal Data2, so that the eleventh transistor M11 may be turned on.

During a period when the eleventh transistor M11 is turned on, the eleventh transistor M11 transmits the driving signal to the tenth transistor M10. The tenth transistor M10 is turned on under the control of the enable signal Em, so that the driving signal is transmitted to the element to be driven 3, thereby making the element to be driven 3 work.

As for the driving processes of the pixel driving circuits 100 corresponding to the sub-pixels in the second row to the nth row in the working phase t-em, reference may be made to the above description of the driving processes of the pixel driving circuits 100 corresponding to the sub-pixels in the first row in the working phase t-em.

In some embodiments, in the scanning phase t-s, potentials V1 of the first data signals Data1 written into the pixel driving circuits 100 corresponding to the sub-pixels in each row are related to magnitudes of driving signals generated by the pixel driving circuits 100 corresponding to the sub-pixels in the row in the working phase t-em.

It will be seen from the above that, in the working phase t-em, potentials at second terminals of first storage capacitors C1 of the pixel driving circuits 100 corresponding to the sub-pixels in each row are each a sum of, a difference of, the product of 2 and Vd, and V1, and Vth1 (i.e., 2Vd−V1+Vth1). Then, potentials at control electrodes of third transistors are each the sum of, the difference of, the product of 2 and Vd, and V1, and Vth1 (i.e., 2Vd−V1+Vth1), and the potentials at the control electrodes of the third transistors are each Vd, and thus gate-to-source voltages $V_{gs}$ of the third transistors M3 are each a difference of, the sum of, the difference of, the product of 2 and Vd, and V1, and Vth1, and Vd, i.e., a sum of, a difference of Vd and V1, and Vth1 (i.e., 2Vd−V1+Vth1−Vd=Vd−V1+Vth1). Therefore, in the working phase t-em, according to a current saturation formula, the driving current generated by the third transistor M3 is:

$$
\begin{aligned}
I_{ds} &= \frac{W}{2L} \times \mu \times C_{ox}(V_{gs} - Vth1)^2 \\
&= \frac{W}{2L} \times \mu \times C_{ox}(2Vd - V1 + Vth1 - Vd - Vth1)^2 \\
&= \frac{W}{2L} \times \mu \times C_{ox}(Vd - V1)^2
\end{aligned}
$$

$I_{ds}$ is a saturation current of the third transistor M3, i.e., a working current input to a light-emitting diode 31, W/L is a channel width-to-length ratio of the third transistor M3, μ is a carrier mobility, $C_{ox}$ is a channel capacitance per unit area of the third transistor M3, $V_{gs}$ is a gate-to-source voltage of the third transistor M3, and Vth1 is the threshold voltage of the third transistor M3.

It will be seen that, the driving current generated by the third transistor M3 is only related to the potential Vd of the first voltage signal Vdd and the potential V1 of the written first data signal Data1, and has nothing to do with the threshold voltage Vth1 of the third transistor M3. Therefore, a magnitude of the driving current generated by the third transistor M3 is not affected by the threshold voltage, thereby preventing a difference in the threshold voltage of the third transistor M3 caused by a manufacturing process from affecting the driving current, and further affecting a display effect.

By controlling the potentials V1(1) to V1(n) of the first data signals Data1 written into the pixel driving circuits 100 corresponding to the sub-pixels in each row in the first row scanning period t1 to the nth row scanning period, magnitudes of driving currents generated by the pixel driving circuits 100 corresponding to the sub-pixels in each row are controlled, thereby controlling luminous intensities of light-emitting diodes 31.

In some embodiments, in the first sub-period in each row scanning period, the absolute value of the set working potential Vs of the second data signal Data2 is related to the duration for which the corresponding element to be driven 3 needs to work.

As shown in FIG. 6, in the first sub-period t1-1 in the first row scanning period t1, set working potentials of second data signals data2 written into the pixel driving circuits 100 corresponding to the sub-pixels in the first row are Vs(1); in the first sub-period t2-1 in the second row scanning period t2, set working potentials of second data signals data2 written into pixel driving circuits 100 corresponding to sub-pixels in the second row are Vs(2); and in the first sub-period tn-1 in the nth row scanning period, set working potentials of second data signals data2 written into pixel driving circuits 100 corresponding to sub-pixels in a n-th row are Vs(n), and the absolute values of Vs(1), Vs(2) and Vs(n) sequentially decreases.

After the working phase t-em is started, the potentials of the second data signals data2 written into the pixel driving circuits 100 corresponding to the sub-pixels in each row varies within the set range. In a case where the potential of the second data signal data2 varies from the non-working potential Vgf (0 V) to the set working potential Vs, the eleventh transistor M11 is turned on, so that the driving signal is transmitted to the element to be driven.

With reference to FIG. 6 again, in the working phase t-em, in the process that the potential of the second data signal data2 varies from the non-working potential Vgf (0 V) to the set working potential Vs, the smaller the absolute value of the set working potential Vs is, the shorter a required duration for which the potential of the second data signal data2 varies from the non-working potential (0 V) to the set working potential Vs is. Therefore, in the working phase t-em, the longer a duration for which the eleventh transistor M11 is turned on, the longer a duration for which the driving signal is transmitted to the light-emitting diode 31 is. The longer a duration for which the light-emitting diode 31 works in a frame period (1 Frame), the stronger the luminous intensity of the light-emitting diode 31 is.

For example, as shown in FIG. 5, in a case where the anode of the light-emitting diode 31 is electrically connected to the second electrode of the tenth transistor M10, the node at which the anode of the light-emitting diode 31 is electrically connected to the second electrode of the tenth transistor M10 is equivalent to the fifth node N5, and the cathode of the light-emitting diode 31 is grounded, the light-emitting diode 31 starts to emit light when a potential at the fifth node N5 is at a high level. It will be seen from FIG. 6 that the absolute values of Vs(1), Vs(2) and Vs(N) sequentially decreases, and corresponding light-emitting durations tN5 (1), tN5(2), and tN5(n) of the light-emitting diode 31 sequentially increases, so that the displays with different gray scales may be implemented.

In summary, as for the pixel driving method provided by the present disclosure, the magnitude of the generated driving signal may be controlled by controlling the potential of the first data signal Data1 written into the driving signal control sub-circuit in the scanning phase t-s, and the working duration of the driving element to be driven 3 may be controlled by controlling the absolute value of the set working potential of the second data signal Data2 written into the driving duration control sub-circuit 2 in the scanning phase t-s, so that the displays with different gray scales may be implemented under coordination of different driving signals and different working durations. In addition, the magnitude of the driving signal may be maintained in a high value range by shortening the working duration of the element to be driven, thereby improving a working efficiency of the element to be driven and saving the energy consumption.

Furthermore, the control over the driving signal and the control over the working duration are irrelevant to the threshold voltage of the transistor, thereby avoiding that the display effect is affected due to an unstable threshold voltage of the transistor caused by process defects.

Some embodiments of the present disclosure provide a display panel including the above pixel driving circuits.

The above pixel driving circuits are used in the display panel provided by the present disclosure. In a case where the element to be driven is a micro light-emitting diode, according to characteristics of a high luminous efficiency at a high current density and a low luminous efficiency at a low current density that the micro light-emitting diode has, when a current control and a control over a light-emitting duration are combined to implement the displays with different gray scales, a luminous intensity of the micro light-emitting diode is controlled by controlling the light-emitting duration of the micro light-emitting diode, so that a value of the current input to the micro light-emitting diode is kept in a high range, and then the micro light-emitting diode is always at the high current density and has the high luminous efficiency, thereby reducing the power consumption and saving the cost.

Figure 7:
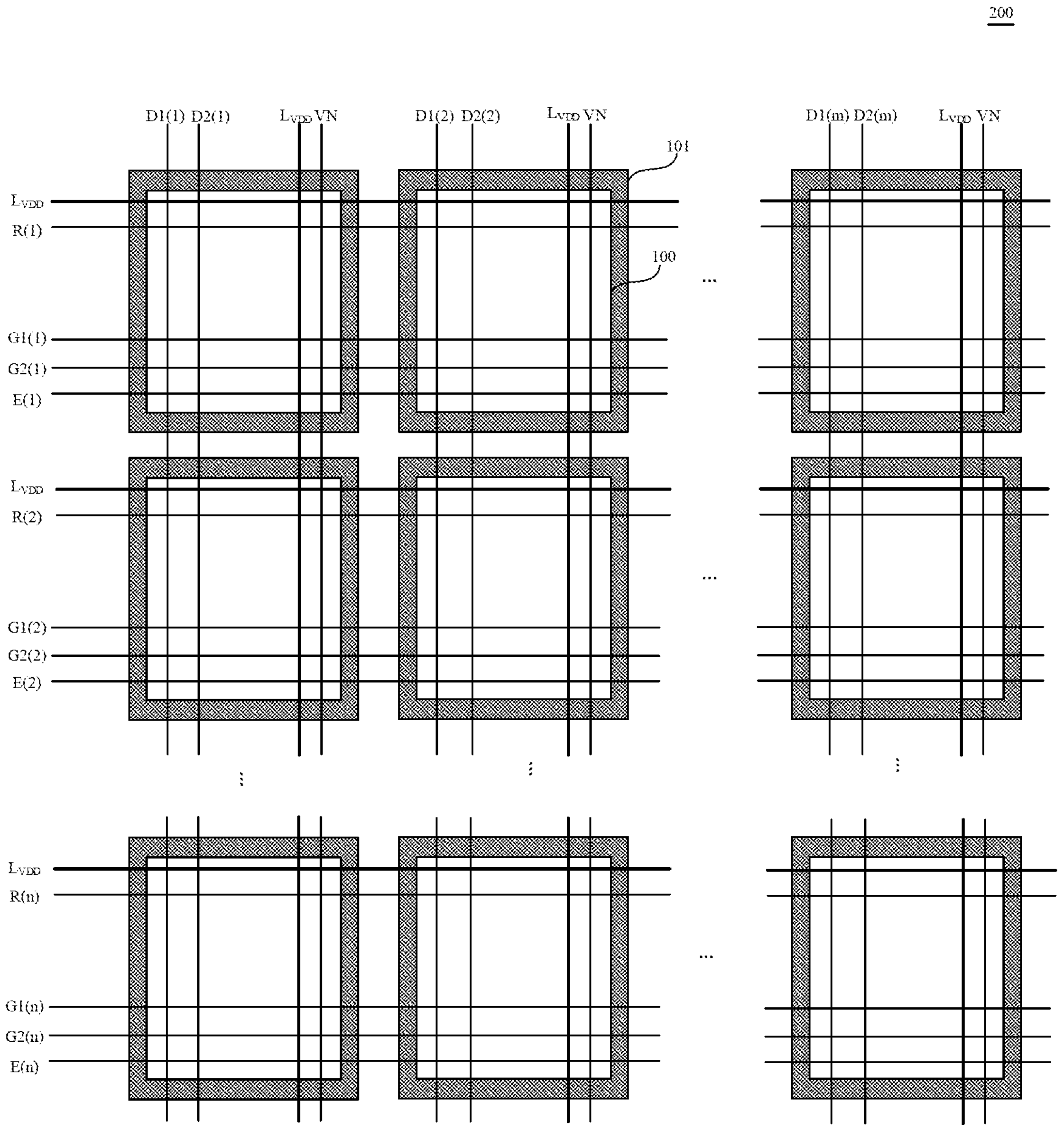
FIG. 7 is a schematic structural diagram of a display panel, in accordance with some embodiments of the present disclosure.

In some embodiments, as shown in FIG. 7, the display panel 200 includes a plurality of sub-pixels 101. Each sub-pixel 101 corresponds to a pixel driving circuit 100, and the plurality of sub-pixels 101 are arranged in an array of multiple rows and multiple columns. For example, the plurality of sub-pixels 101 are arranged in an array of n rows and m columns.

The display panel 200 further includes a plurality of first scanning signal lines G1(1) to G1 (n), a plurality of first data signal lines D1(1) to D1 (m), a plurality of second scanning signal lines G2(1) to G2(n), and a plurality of second data signal lines D2 (1) to D2(m).

Pixel driving circuits 100 corresponding to sub-pixels 101 in a same row are electrically connected to a same first scanning signal line and a same second scanning signal line. Pixel driving circuits 100 corresponding to sub-pixels 101 in a same column are electrically connected to a same first data signal line and a same second data signal line. For example, the pixel driving circuits 100 corresponding to the sub-pixels 101 in the first row are electrically connected to the first scanning signal line G1(1) and the second scanning signal line G2(1), and the pixel driving circuits 100 corresponding to the sub-pixels 101 in the first column are electrically connected to the first data signal line D1(1) and the second data signal line D2(1).

In this way, the plurality of first scanning signal lines provide first scanning signals Gate1 for first scanning signal terminals GATE1, the plurality of second scanning signal lines provide second scanning signals Gate2 for second scanning signal terminals GATE2, the plurality of first data signal lines provide first data signals Data1 for first data signal terminals DATA1, and the plurality of second data signal lines provide second data signals Data2 for second data signal terminals DATA2, thereby providing the first scanning signals Gate1, the second scanning signals Gate2, the first data signals Data1 and the second data signals Data2 for the pixel driving circuits 100.

The display panel 200 further includes a plurality of reset signal lines R(1) to R(n), a plurality of enable signal lines E1(1) to E1(n), a plurality of initialization signal lines VN, and a plurality of first voltages signal lines LVDD.

The pixel driving circuit 100 corresponding to the sub-pixels 101 in the same row are electrically connected to a same reset signal line and a same enable signal line. The pixel driving circuits 100 corresponding to the sub-pixels 101 in the same column are electrically connected to a same initialization signal line.

The plurality of first voltage signal lines LVDD are arranged in a mesh shape in a row direction and in a column direction, and the pixel driving circuits 100 corresponding to the sub-pixels 101 in the same column are electrically connected to a same first voltage signal line LVDD arranged in the column direction. A plurality of first voltage signal lines LVDD arranged in the row direction are electrically connected to a plurality of first voltage signal lines LVDD arranged in the column direction. The plurality of first voltage signal lines LVDD arranged in the row direction are configured to reduce resistances of the plurality of first voltage signal lines LVDD arranged in the column direction, so as to reduce RC loads and IR drops of first voltage signals Vdd.

In this way, the plurality of reset signal lines provide reset signals Reset for reset signal terminals RESET, the plurality of enable signal lines provide enable signals Em for enable signal terminals EM, the plurality of initialization signal lines provide initialization signals Vint for initialization signal terminals VINIT, and the plurality of first voltage signal lines arranged in the column direction provide first voltage signals Vdd for first voltage signal terminals VDD, thereby providing the reset signals Reset, the enable signals EM, the initialization signals VINIT, and the first voltage signals VDD for the pixel driving circuits 100.

It will be noted that, the arrangement of the plurality of signal lines included in the display panel 200 and the wiring diagram of the display panel 200 shown in FIG. 7 are merely examples, and do not constitute limitations on a structure of the display panel.

In some embodiments, the display panel 200 further includes:

a base substrate on which the pixel driving circuits are arranged, the base substrate being a glass substrate.

In some embodiments, the display panel is a micro LED display panel, and each of the plurality of sub-pixels included in the display panel corresponds to at least one micro light-emitting diode.

Since as for the characteristics of the high luminous efficiency at the high current density and the low luminous efficiency at the low current density that the micro light-emitting diode has, the pixel driving circuit 100 provided by the present disclosure combines the current control and the control over the light-emitting duration to implement the displays with different gray scales. When the low gray scale display is implemented, by shortening the light-emitting duration of the micro light-emitting diode and keeping the current input to the micro light-emitting diode in the high range, the micro light-emitting diode is always at the high current density and has the high luminous efficiency, thereby reducing the power consumption and saving the cost of the display panel. Therefore, the display panel provided by the present disclosure can adopt an active driving method.

The display panel provided by the present disclosure adopts the active driving method, and the pixel driving circuits 100 may be disposed on the base substrate made of glass. Since a splicing process of the glass substrate is mature, the display panel may be spliced according to a display size to obtain a display panel with a large display size, which is suitable for being watched at a medium distance. For example, the display panel is a television screen. Moreover, since the display panel adopts the active driving method and the glass substrate is used as the base substrate in the display panel, the pixel driving circuits may be manufactured by using manufacturing processes with high precisions such as exposure, development and etching, so that a precision of the obtained pixel driving circuits 100 is high, and a size of the sub-pixels is reduced. For example, the size of the sub-pixels may be made to 400 μm or even smaller. Therefore, a resolution of the display panel is improved, and an image quality of the displayed image is fine. In a case where the display panel is the micro LED display panel, a color gamut and a brightness of the display panel may be improved, a HDR display may be implemented, thereby improving the display effect of the displayed image of the display panel.

In some embodiments, transistors in the pixel driving circuits 100 included in the display panel 200 are manufactured on the glass substrate by using a low temperature poly-silicon (LTPS) process. Since the low temperature poly-silicon has characteristics of high mobility and good stability, a response speed of the manufactured transistors may be improved. Thus, the LTPS process is more suitable for the pixel driving circuit 100 adopting the control over the driving current and a control over a driving duration that is provided by the present disclosure. In addition, since the threshold voltages of the third transistor M3 and the eleventh transistor M11 have been compensated in the driving method of the pixel driving circuit 100, the display effect of the display panel 200 is not affected by shifts of the threshold voltages of the transistors caused by defects of the LTPS process.

Figure 8:
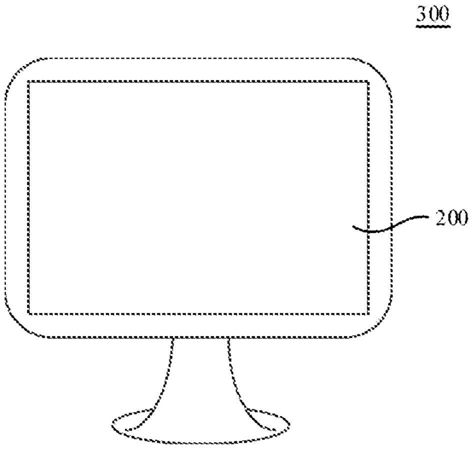
FIG. 8 is a schematic diagram of a display device, in accordance with some embodiments of the present disclosure.

As shown in FIG. 8, some embodiments of the present disclosure provide a display device 300 including the above display panel 200.

The display device 300 provided by the present disclosure includes the above display panel 200. Therefore, the display device 300 has characteristics of large display size, high pixel resolution, being suitable for the HDR display, and good display effect.

In some examples, the display device 300 is a product with a display function such as a television, a cellphone, a tablet computer, a notebook computer, a display, a digital photo frame or a navigator, which is not limited in the present disclosure.

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subjected to the protection scope of the claims.

What is claimed is:

1. A pixel driving circuit, comprising: a driving signal control sub-circuit and a driving duration control sub-circuit; wherein the driving signal control sub-circuit is electrically connected to a first scanning signal terminal, a first data signal terminal, a first voltage signal terminal, an enable signal terminal, and the driving duration control sub-circuit, and is configured to provide a driving signal to the driving duration control sub-circuit under control of both the first scanning signal terminal and the enable signal terminal; and the driving signal is related to a first data signal received at the first data signal terminal and a first voltage signal received at the first voltage signal terminal; and the driving duration control sub-circuit is further electrically connected to a second scanning signal terminal, a second data signal terminal, the enable signal terminal and an element to be driven, and is configured to, under control of the second scanning signal terminal and the enable signal terminal, transmit the driving signal to the element to be driven based on a second data signal with a potential varying within a set range received at the second data signal terminal, so as to control a duration for which the driving signal is transmitted to the element to be driven;

wherein the first data signal is different from the second data signal;

the driving signal control sub-circuit includes a first data writing unit, a first driving unit, and a first control unit, wherein the first data writing unit is electrically connected to the first scanning signal terminal, the first data signal terminal and the first driving unit, and is configured to write the first data signal received at the first data signal terminal into the first driving unit under control of the first scanning signal terminal;

the first driving unit is further electrically connected to the first voltage signal terminal and the first control unit, and is configured to generate the driving signal according to the written first data signal and the first voltage signal received at the first voltage signal terminal, and transmit the driving signal to the first control unit; and the first control unit is further electrically connected to the enable signal terminal, the first voltage signal terminal, and the driving duration control sub-circuit, and is configured to transmit the driving signal to the driving duration control sub-circuit according to the first voltage signal under control of the enable signal terminal; and the driving duration control sub-circuit includes a second data writing unit, a second control unit, and a second driving unit, wherein the second data writing unit is electrically connected to the second scanning signal terminal, the second data signal terminal, and the second driving unit, and is configured to write a second data signal with a set working potential received at the second data signal terminal into the second driving unit under control of the second scanning signal terminal;

the second control unit is electrically connected to the enable signal terminal, the second data signal terminal, and the second driving unit, and is configured to transmit the second data signal with the potential varying within the set range received at the second data signal terminal to the second driving unit under control of the enable signal terminal;

the second driving unit is further electrically connected to the driving signal control sub-circuit, and is configured to transmit the driving signal to the second control unit and control a duration for which the driving signal is transmitted to the second control unit, according to the second data signal with the set working potential and the second data signal with the potential varying within the set range; and the second control unit is further electrically connected to the element to be driven, and is further configured to transmit the driving signal to the element to be driven.

2. The pixel driving circuit according to claim 1, wherein the first data writing unit includes:

a first transistor, a control electrode of the first transistor being electrically connected to the first scanning signal terminal, a first electrode of the first transistor being electrically connected to the first data signal terminal, and a second electrode of the first transistor being electrically connected to the first driving unit; and a second transistor, a control electrode of the second transistor being electrically connected to the first scanning signal terminal, and a first electrode and a second electrode of the second transistor being electrically connected to the first driving unit;

the first driving unit includes:

a first storage capacitor, a first terminal of the first storage capacitor being electrically connected to the first data writing unit and the first control unit, and a second terminal of the first storage capacitor being electrically connected to the first data writing unit; and a third transistor, a control electrode of the third transistor being electrically connected to the second terminal of the first storage capacitor and the first data writing unit, a first electrode of the third transistor being electrically connected to the first voltage signal terminal, and a second electrode of the third transistor being electrically connected to the first data writing unit and the first control unit; and the first control unit includes:

a fourth transistor, a control electrode of the fourth transistor being electrically connected to the enable signal terminal, a first electrode of the fourth transistor being electrically connected to the first voltage signal terminal, and a second electrode of the fourth transistor being electrically connected to the first driving unit; and a fifth transistor, a control electrode of the fifth transistor being electrically connected to the enable signal terminal, a first electrode of the fifth transistor being electrically connected to the first driving unit, and a second electrode of the fifth transistor being electrically connected to the driving duration control sub-circuit.

3. The pixel driving circuit according to claim 1, wherein the driving signal control sub-circuit further includes a first reset unit; and the first reset unit is electrically connected to the first voltage signal terminal, a reset signal terminal, an initialization signal terminal and the first driving unit, and is configured to reset a voltage of the first driving unit according to the first voltage signal received at the first voltage signal terminal and an initialization signal received at the initialization signal terminal under control of the reset signal terminal.

4. The pixel driving circuit according to claim 3, wherein the first reset unit includes:

a sixth transistor, a control electrode of the sixth transistor being electrically connected to the reset signal terminal, a first electrode of the sixth transistor being electrically connected to the first voltage signal terminal, and a second electrode of the sixth transistor being electrically connected to the first driving unit; and a seventh transistor, a control electrode of the seventh transistor being electrically connected to the reset signal terminal, a first electrode of the seventh transistor being electrically connected to the initialization signal terminal, and a second electrode of the seventh transistor being electrically connected to the first driving unit.

5. The pixel driving circuit according to claim 1, wherein the driving signal control sub-circuit includes a first transistor, a second transistor, a third transistor, a fourth transistor, a fifth transistor, a sixth transistor, a seventh transistor, and a first storage capacitor;

a control electrode of the first transistor is electrically connected to the first scanning signal terminal, a first electrode of the first transistor is electrically connected to the first data signal terminal, and a second electrode of the first transistor is electrically connected to a first terminal of the first storage capacitor;

a control electrode of the second transistor is electrically connected to the first scanning signal terminal, a first electrode of the second transistor is electrically connected to a second electrode of the third transistor, and a second electrode of the second transistor is electrically connected to a second terminal of the first storage capacitor and a control electrode of the third transistor;

the control electrode of the third transistor is further electrically connected to the second terminal of the first storage capacitor, a first electrode of the third transistor is electrically connected to the first voltage signal terminal, and the second electrode of the third transistor is further electrically connected to a first electrode of the fifth transistor;

a control electrode of the fourth transistor is electrically connected to the enable signal terminal, a first electrode of the fourth transistor is electrically connected to the first voltage signal terminal, and a second electrode of the fourth transistor is electrically connected to the first terminal of the first storage capacitor;

a control electrode of the fifth transistor is electrically connected to the enable signal terminal, and a second electrode of the fifth transistor is electrically connected to the driving duration control sub-circuit;

a control electrode of the sixth transistor is electrically connected to a reset signal terminal, a first electrode of the sixth transistor is electrically connected to the first voltage signal terminal, and a second electrode of the sixth transistor is electrically connected to the first terminal of the first storage capacitor; and a control electrode of the seventh transistor is electrically connected to the reset signal terminal, a first electrode of the seventh transistor is electrically connected to an initialization signal terminal, and a second electrode of the seventh transistor is electrically connected to the second terminal of the first storage capacitor and the control electrode of the third transistor.

6. The pixel driving circuit according to claim 5, wherein the first transistor, the second transistor, the third transistor, the fourth transistor, the fifth transistor, the sixth transistor, and the seventh transistor are all P-type transistors.

7. The pixel driving circuit according to claim 1, wherein the second data writing unit includes:

an eighth transistor, a control electrode of the eighth transistor being electrically connected to the second scanning signal terminal, a first electrode of the eighth transistor being electrically connected to the second data signal terminal, and a second electrode of the eighth transistor being electrically connected to the second driving unit;

the second control unit includes:

a ninth transistor, a control electrode of the ninth transistor being electrically connected to the enable signal terminal, a first electrode of the ninth transistor being electrically connected to the second data signal terminal, and a second electrode of the ninth transistor being electrically connected to the second driving unit; and a tenth transistor, a control electrode of the tenth transistor being electrically connected to the enable signal terminal, a first electrode of the tenth transistor being electrically connected to the second driving unit, and a second electrode of the tenth transistor being electrically connected to a light-emitting sub-circuit; and the second driving unit includes:

a second storage capacitor, a first terminal of the second storage capacitor being electrically connected to the second data writing unit and the second control unit; and an eleventh transistor, a control electrode of the eleventh transistor being electrically connected to a second terminal of the second storage capacitor, a first electrode of the eleventh transistor being electrically connected to the driving signal control sub-circuit, and a second electrode of the eleventh transistor being electrically connected to the second control unit.

8. The pixel driving circuit according to claim 1, wherein the driving duration control sub-circuit further includes a second reset unit; and the second reset unit is electrically connected to a reset signal terminal, an initialization signal terminal, and the second driving unit, and is configured to reset a voltage of the second driving unit according to an initialization signal received at the initialization signal terminal under control of the reset signal terminal.

9. The pixel driving circuit according to claim 8, wherein the second reset unit includes:

a twelfth transistor, a control electrode of the twelfth transistor being electrically connected to the reset signal terminal, a first electrode of the twelfth transistor being electrically connected to the initialization signal terminal, and a second electrode of the twelfth transistor is electrically connected to the second driving unit; and a thirteenth transistor, a control electrode of the thirteenth transistor being electrically connected to the reset signal terminal, and a first electrode and a second electrode of the thirteenth transistor being electrically connected to the second driving unit.

10. The pixel driving circuit according to claim 1, wherein the driving duration control sub-circuit includes an eighth transistor, a ninth transistor, a tenth transistor, an eleventh transistor, a twelfth transistor, a thirteenth transistor and a second storage capacitor; wherein a control electrode of the eighth transistor is electrically connected to the second scanning signal terminal, a first electrode of the eighth transistor is electrically connected to the second data signal terminal, and a second electrode of the eighth transistor is electrically connected to a first terminal of the second storage capacitor;

a control electrode of the ninth transistor is electrically connected to the enable signal terminal, a first electrode of the ninth transistor is electrically connected to the second data signal terminal, and a second electrode of the ninth transistor is electrically connected to a first terminal of the second storage capacitor;

a control electrode of the tenth transistor is electrically connected to the enable signal terminal, a first electrode of the tenth transistor is electrically connected to a second electrode of the eleventh transistor, and a second electrode of the tenth transistor is electrically connected to a light-emitting sub-circuit;

a control electrode of the eleventh transistor is electrically connected to the second terminal of the second storage capacitor, a first electrode of the eleventh transistor is connected to the driving signal control sub-circuit and a second electrode of the twelfth transistor, and the second electrode of the eleventh transistor is further electrically connected to a first electrode of the thirteenth transistor;

a control electrode of the twelfth transistor is electrically connected to a reset signal terminal, and a first electrode of the twelfth transistor is electrically connected to an initialization signal terminal; and a control electrode of the thirteenth transistor is electrically connected to the reset signal terminal, and a second electrode of the thirteenth transistor is electrically connected to the second terminal of the second storage capacitor and the control electrode of the eleventh transistor.

11. The pixel driving circuit according to claim 10, wherein the eighth transistor, the ninth transistor, the tenth transistor, the eleventh transistor, the twelfth transistor, and the thirteenth transistor are all P-type transistors.

12. A pixel driving method, applied to the pixel driving circuit according to claim 1, the pixel driving method comprising: a frame period including a scanning phase and a working phase, the scanning phase including a plurality of row scanning periods, wherein in each of the plurality of row scanning periods, the pixel driving method includes:

writing the first data signal to the driving signal control sub-circuit under the control of the first scanning signal terminal, wherein the first data writing unit is turned on under the control of the first scanning signal terminal, so that the first data signal received at the first data signal terminal is written into the first driving unit;

and writing the second data signal with the set working potential to the driving duration control sub-circuit under the control of the second scanning signal terminal, wherein the second data writing unit is turned on under the control of the second scanning signal terminal, so that the second data signal with the set working potential received at the second data signal terminal is written into the second driving unit; and the working phase includes:

providing, by the driving signal control sub-circuit, the driving signal to the driving duration control sub-circuit under the control of the enable signal terminal, the driving signal being related to the first data signal and the first voltage signal provided by the first voltage signal terminal, wherein the first control unit is turned on under the control of the enable signal terminal, so that the driving signal is transmitted to the driving duration control sub-circuit; and receiving, by the driving duration control sub-circuit, the second data signal with the potential varying within the set range under the control of the enable signal terminal; and transmitting, by the driving duration control sub-circuit, the driving signal to the element to be driven, the duration for which the driving signal is transmitted to the element to be driven being related to the second data signal with the set working potential and the second data signal with the potential varying within the set range, wherein the second control unit is turned on under the control of the enable signal terminal, so that the second data signal with the potential varying within the set range is written into the second driving unit, the second driving unit is turned on, the driving signal is transmitted to the first control unit, and the driving signal is transmitted to the element to be driven by the first control unit;

wherein the first data signal is different from the second data signal.

13. The pixel driving method according to claim 12, wherein an absolute value of the set working potential is related to a duration for which a corresponding element to be driven needs to work.

14. The pixel driving method according to claim 13, wherein two endpoint values in the set range are a non-working potential and a reference working potential of the second data signal;

an absolute value of the reference working potential is greater than or equal to a maximum value in absolute values of all working potentials of the second data signal; and the set working potential is within the set range.

15. A display panel, comprising the pixel driving circuit according to claim 1.

16. The display panel according to claim 15, the display panel comprising a plurality of sub-pixels, each sub-pixel corresponding to a pixel driving circuit, and the plurality of sub-pixels being arranged in an array of multiple rows and multiple columns;

the display panel further comprising a plurality of first scanning signal lines, a plurality of first data signal lines, a plurality of second scanning signal lines, and a plurality of second data signal lines;

pixel driving circuits corresponding to sub-pixels in a same row being electrically connected to a same first scanning signal line and a same second scanning signal line; and pixel driving circuits corresponding to sub-pixels in a same column being electrically connected to a same first data signal line and a same second data signal line.

17. A display device, comprising the display panel according to claim 15.

* * * * *